(12) United States Patent
Kwak et al.

(10) Patent No.: US 11,978,342 B2
(45) Date of Patent: May 7, 2024

(54) METHOD FOR TRANSMITTING SAFETY MESSAGE IN WIRELESS COMMUNICATION SYSTEM SUPPORTING SIDELINK AND APPARATUS THEREFORTHEREFOR

(71) Applicant: LG ELECTRONICS INC., Seoul (KR)

(72) Inventors: Minsung Kwak, Seoul (KR); Seungryul Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 89 days.

(21) Appl. No.: 17/593,776

(22) PCT Filed: Mar. 27, 2020

(86) PCT No.: PCT/KR2020/004177
§ 371 (c)(1),
(2) Date: Sep. 24, 2021

(87) PCT Pub. No.: WO2020/197310
PCT Pub. Date: Oct. 1, 2020

(65) Prior Publication Data
US 2022/0180748 A1    Jun. 9, 2022

(30) Foreign Application Priority Data

Mar. 27, 2019   (KR) .......................... 10-2019-0035274
Apr. 18, 2019   (KR) .......................... 10-2019-0045561

(51) Int. Cl.
*G08G 1/16*       (2006.01)
*H04W 4/40*      (2018.01)
(Continued)

(52) U.S. Cl.
CPC ................ *G08G 1/16* (2013.01); *H04W 4/40* (2018.02); *H04W 72/25* (2023.01); *B60W 60/0015* (2020.02); *B60W 2556/45* (2020.02)

(58) Field of Classification Search
CPC ................................ G08G 1/16; H04W 72/25
See application file for complete search history.

(56) References Cited

U.S. PATENT DOCUMENTS

2016/0260328 A1\*  9/2016  Mishra ................... G01S 13/931
2017/0243485 A1\*  8/2017  Rubin ..................... H04W 4/46
2019/0090173 A1   3/2019  Xiao et al.

FOREIGN PATENT DOCUMENTS

| KR | 20160004835 | 1/2016 |
| KR | 20160079497 | 7/2016 |
| KR | 20170128042 | 11/2017 |

OTHER PUBLICATIONS

PCT International Application No. PCT/KR2020/004177, International Search Report dated Jul. 22, 2020, 15 pages.

\* cited by examiner

*Primary Examiner* — Benyam Haile
(74) *Attorney, Agent, or Firm* — LEE, HONG, DEGERMAN, KANG & WAIMEY PC

(57) ABSTRACT

According to various embodiments, a method for transmitting a safety message, by a UE, in a wireless communication system supporting sidelink, and an apparatus therefor are disclosed. The method for transmitting a safety message, by a UE, in a wireless communication system supporting sidelink comprises the steps of: receiving, from an adjacent UE, a sidelink signal including mobility information on the adjacent UE; calculating a collision risk range for the adjacent UE on the basis of the mobility information on the adjacent UE; and determining whether to transmit a safety message on the basis of the collision risk range to which an (Continued)

estimated threshold value has been applied, wherein the estimated threshold value is determined on the basis of a received decentralized environmental notification message (DENM).

15 Claims, 28 Drawing Sheets

(51) Int. Cl.
*H04W 72/25* (2023.01)
*B60W 60/00* (2020.01)

(a)

(b)

(a)

(b)

METHOD FOR TRANSMITTING SAFETY MESSAGE IN WIRELESS COMMUNICATION SYSTEM SUPPORTING SIDELINK AND APPARATUS THEREFORTHEREFOR

CROSS-REFERENCE TO RELATED APPLICATIONS

This application is the National Stage filing under 35 U.S.C. 371 of International Application No. PCT/KR2020/004177, filed on Mar. 27, 2020, which claims the benefit of earlier filing date and right of priority to Korean Application Nos. 10-2019-0035274, filed on Mar. 27, 2019, and 10-2019-0045561, filed on Apr. 18, 2019, the contents of which are all hereby incorporated by reference herein in their entireties.

TECHNICAL FIELD

A method of transmitting a safety message in a wireless communication system, and an apparatus therefore are disclosed. Specifically, a method of determining whether to transmit the safety message based on a sidelink signal and a decentralized environment notification message (DENM) received from an adjacent user equipment (UE), and an apparatus therefor are disclosed.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

DETAILED DESCRIPTION OF THE DISCLOSURE

Technical Problems

An object to be solved is to provide a method of transmitting a safety message at an accurate and optimal timing in which a change in a surrounding environment is reflected by additionally applying an estimation threshold value determined according to information about the surrounding environment to a collision risk range estimated based on mobility information included in a sidelink signal of an adjacent UE.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

Technical Solutions

According to an aspect, provided herein is a method of transmitting a safety message by a user equipment (UE) in a wireless communication system supporting sidelink, including receiving a sidelink signal including mobility information about an adjacent UE from the adjacent UE, calculating a collision risk range in relation to the adjacent UE based on the mobility information about the adjacent UE, and determining whether to transmit the safety message based on the collision risk range to which an estimation threshold value is applied. The estimation threshold value may be determined based on a received decentralized environmental notification message (DENM).

The estimation threshold value may be dynamically changed based on a value defined in CauseCodeType or SubCauseCodeType included in the received DENM.

The estimation threshold value may be changed based on an increase ratio preset per a value defined in a CauseCodeType or a SubCauseCodeType.

The collision risk range may be increased by application of the estimation threshold value.

The collision risk range may be determined by further considering a deceleration calculated based on the sidelink signal.

The deceleration may be calculated based on vehicle type information included in the sidelink signal.

The deceleration may be corrected based on a value defined in CauseCodeType or SubCauseCodeType included in the DENM.

The collision risk range may be determined by further considering a size of an angle between a heading direction of the UE, and a heading direction of the adjacent UE included in the mobility information.

A transmission cycle of the safety message may be changed based on a movement speed of the UE.

The beam management signal may be transmitted only in a first transmission duration among the plural transmission durations.

The safety message may be repeatedly transmitted at a transmission cycle determined based on event information included in the DENM.

A transmission timing of the safety message may be determined based on a timing at which the adjacent UE enters within the collision risk range to which the estimation threshold value is applied.

The sidelink signal is a cooperative awareness message (CAM).

In another aspect, a user equipment (UE) for transmitting a safety message in a wireless communication system supporting sidelink includes a radio frequency (RF) transceiver, and a processor connected to the RF transceiver. The processor controls the RF transceiver to receive a sidelink signal including mobility information about an adjacent UE from the adjacent UE, calculates a collision risk range in relation to the adjacent UE based on the mobility information about the adjacent UE, and determines whether to transmit the safety message based on the collision risk range to which an estimation threshold value is applied. The estimation threshold value may be determined based on a received decentralized environmental notification message (DENM).

In another aspect, a chipset for transmitting a safety message in a wireless communication system supporting sidelink include at least one processor, and at least one memory operably connected to the at least one processor and configured to cause the at least one processor to perform an operation based on execution of the at least one processor. The operation includes receiving a sidelink signal including mobility information about an adjacent UE from the adjacent UE, calculating a collision risk range in relation to the adjacent UE based on the mobility information about the adjacent UE, and determining whether to transmit the safety message based on the collision risk range to which an estimation threshold value is applied. The estimation threshold value may be determined based on a received decentralized environmental notification message (DENM).

The processor controls a traveling mode of an apparatus connected to the chipset based on the collision risk range.

Advantageous Effects

Various embodiments may transmit a safety message at an accurate and optimal timing in which a change in a surrounding environment is reflected by additionally applying an estimation threshold value determined according to information about the surrounding environment to a collision risk range estimated based on mobility information included in a sidelink signal of an adjacent UE.

Effects to be achieved by embodiment(s) are not limited to what has been particularly described hereinabove and other effects not mentioned herein will be more clearly understood by persons skilled in the art to which embodiment(s) pertain from the following detailed description.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

BEST MODE FOR CARRYING OUT THE DISCLOSURE

Figure 1:
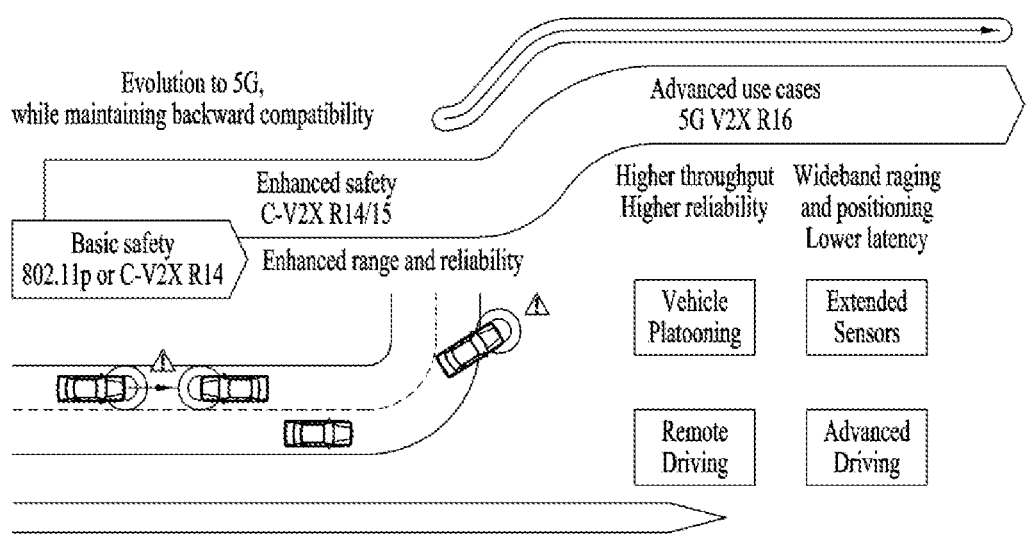
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
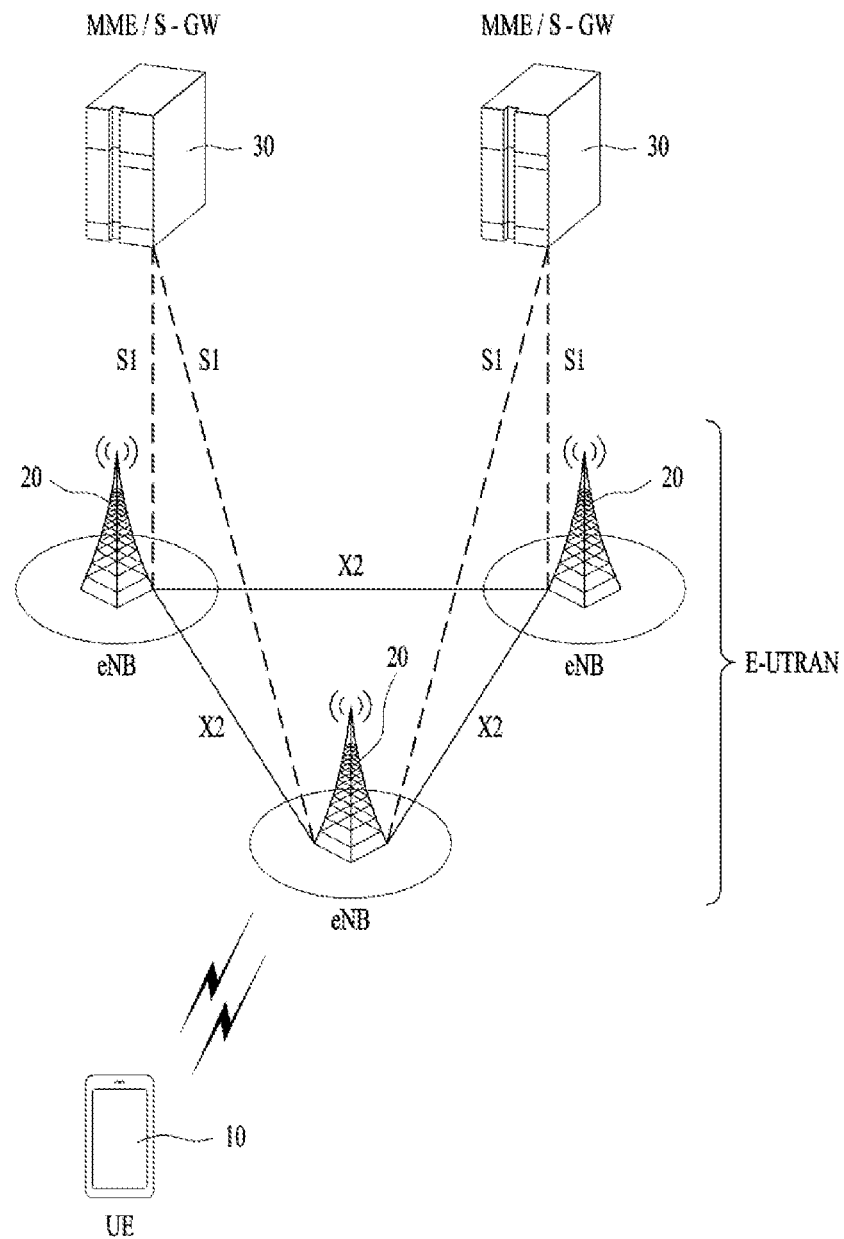
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
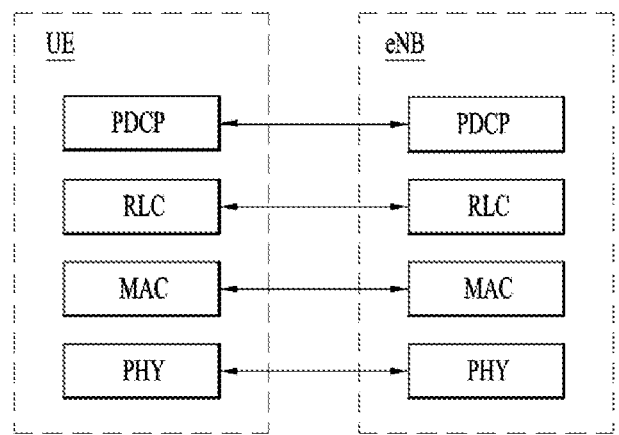
FIG. 3 illustrates a user-plane radio protocol architecture to which embodiment(s) are applicable.

FIG. 3 illustrates a user-plane radio protocol architecture to which the present disclosure is applicable.

Figure 4:
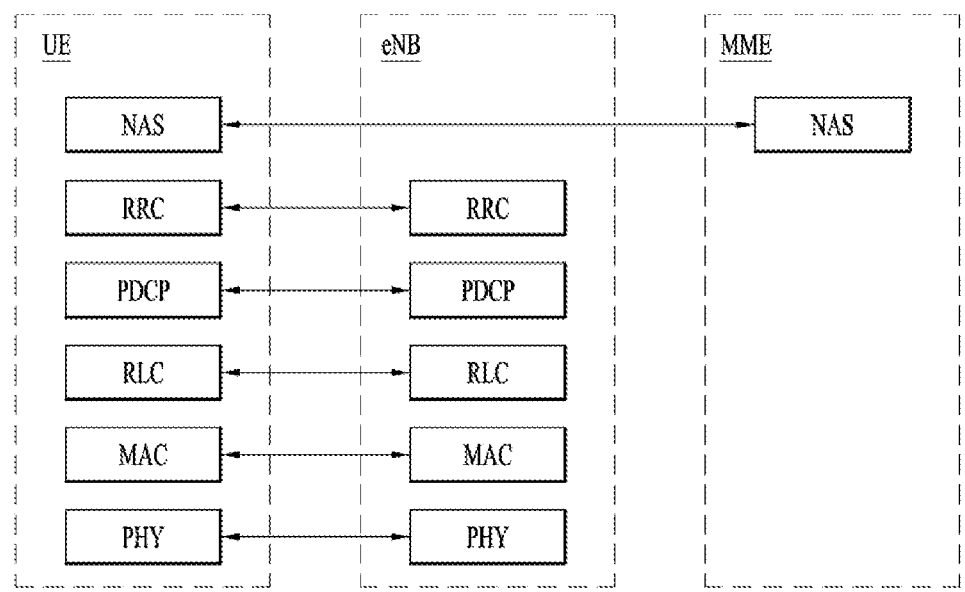
FIG. 4 illustrates a control-plane radio protocol architecture to which embodiment(s) are applicable.

FIG. 4 illustrates a control-plane radio protocol architecture to which the present disclosure is applicable. A user plane is a protocol stack for user data transmission, and a control plane is a protocol stack for control signal transmission.

Referring to FIGS. 3 and 4, the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multi cast control channel (MCCH), and a multicast traffic channel (MTCH).

A physical channel includes a plurality of OFDM symbols in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 5:
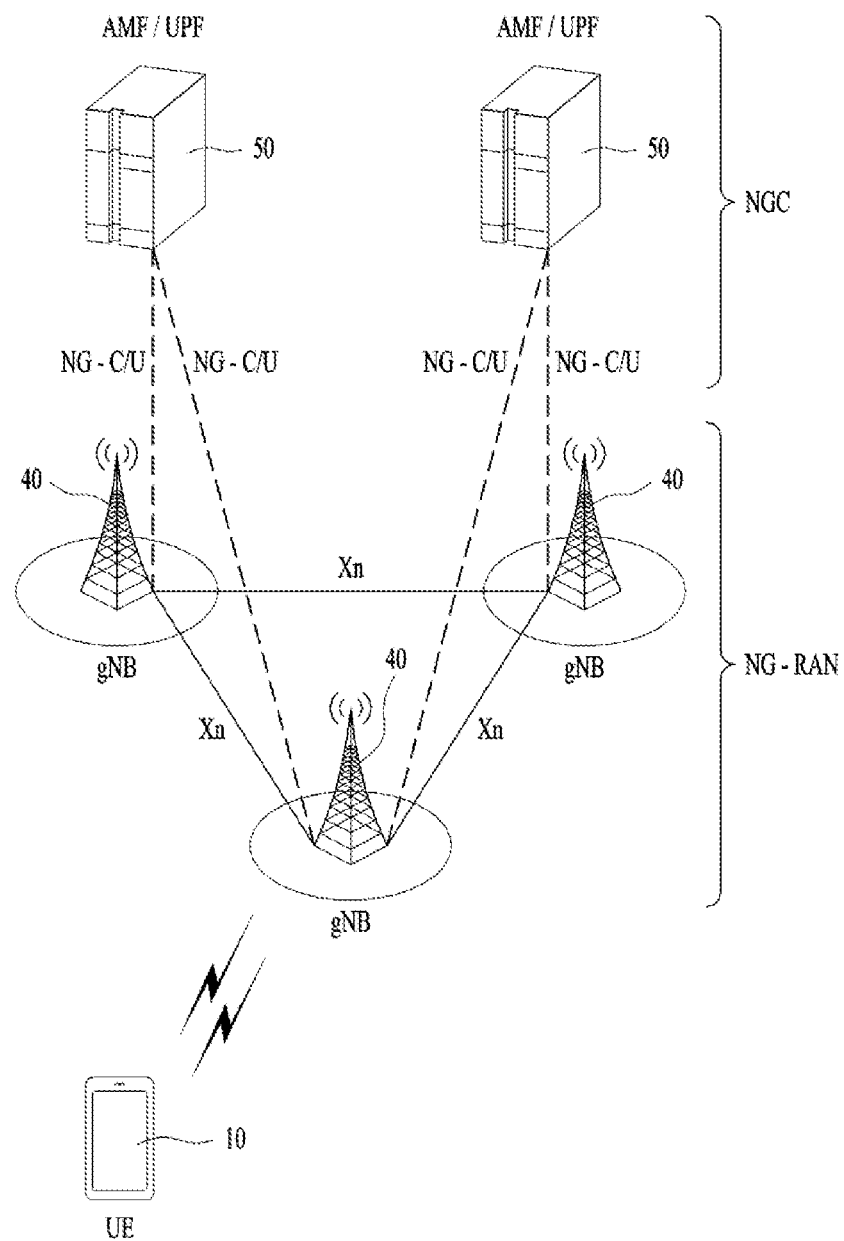
FIG. 5 illustrates the structure of an NR system to which embodiment(s) are applicable.

FIG. 5 illustrates the structure of a NR system to which the present disclosure is applicable.

Referring to FIG. 5, a next generation radio access network (NG-RAN) may include a next generation Node B (gNB) and/or an eNB, which provides user-plane and control-plane protocol termination to a UE. In FIG. 5, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 6:
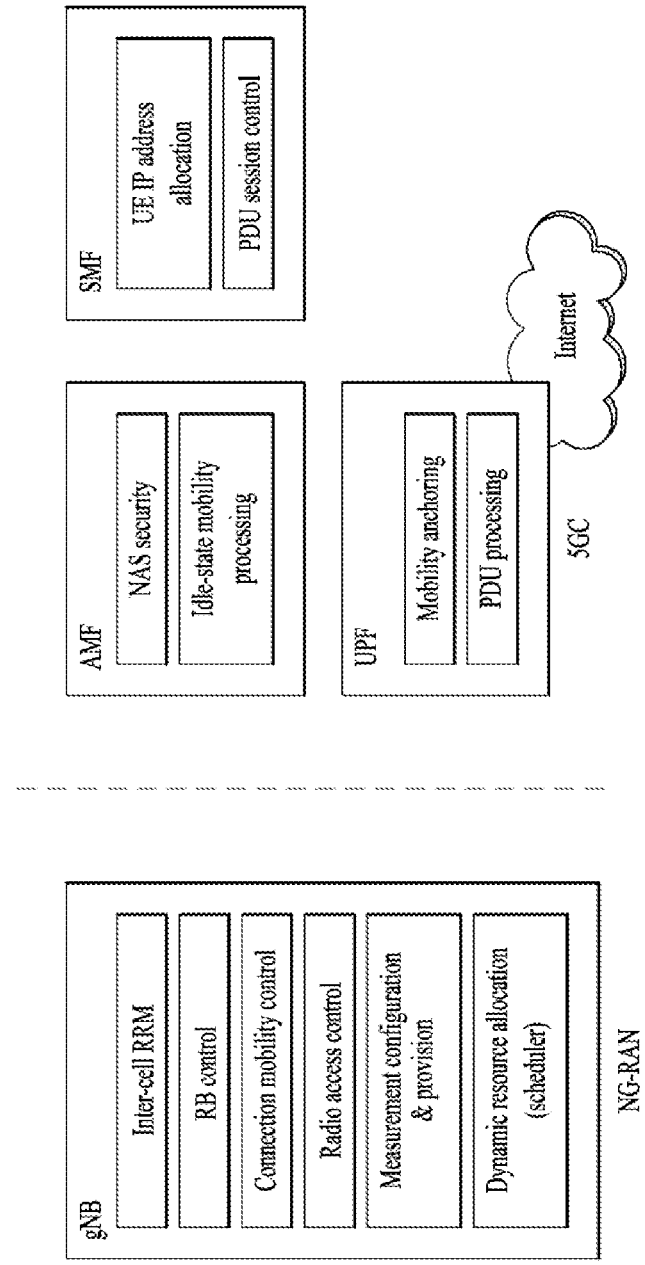
FIG. 6 illustrates functional split between an NG-RAN and a 5GC to which embodiment(s) are applicable.

FIG. 6 illustrates functional split between the NG-RAN and the 5GC to which the present disclosure is applicable.

Referring to FIG. 6, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 7:
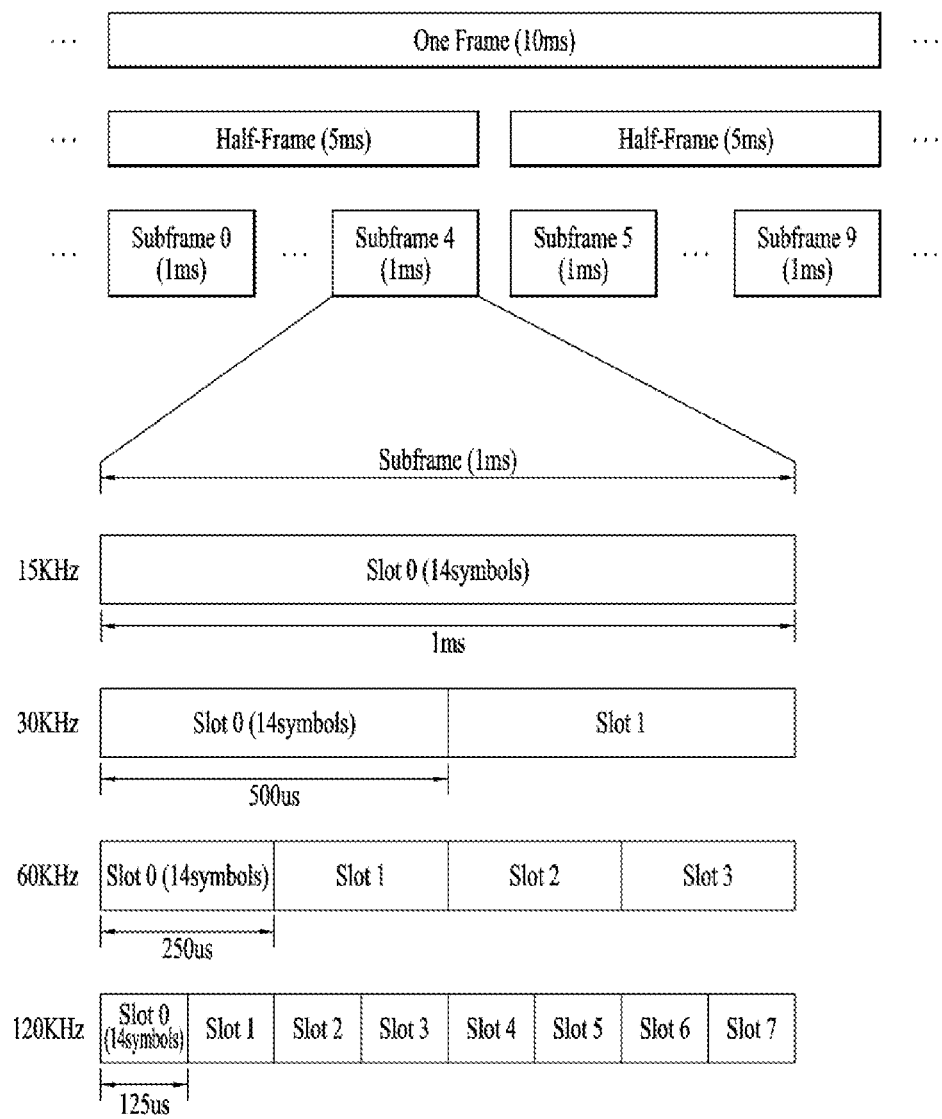
FIG. 7 illustrates the structure of an NR radio frame to which embodiment(s) are applicable.

FIG. 7 illustrates the structure of a NR radio frame to which the present disclosure is applicable.

Referring to FIG. 7, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration $\mu$ in the NCP case.

TABLE 1

| SCS (15*2u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame, u}_{slot}$ | $N^{subframe, u}_{slot}$ |
|---|---|---|---|
| 60 KHz (u=2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 8:
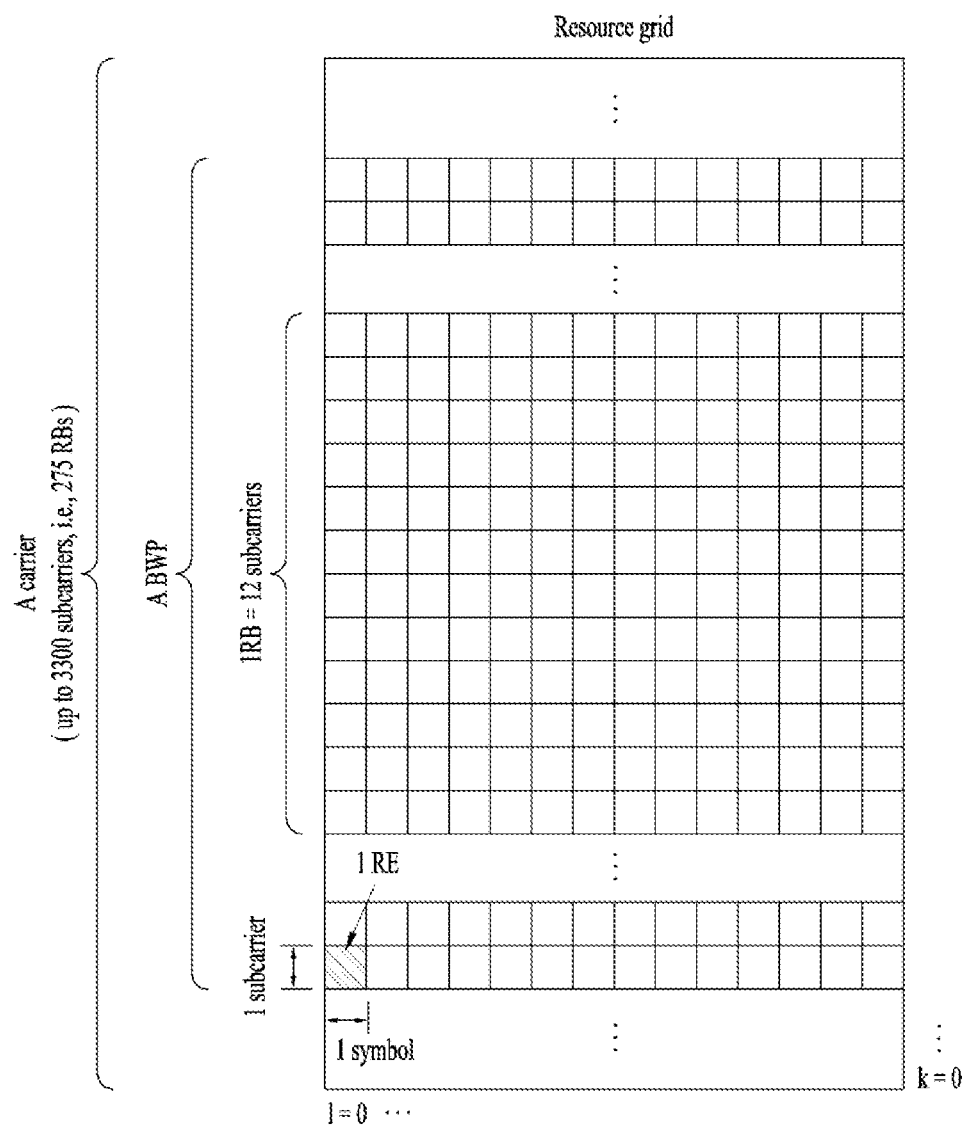
FIG. 8 illustrates the slot structure of an NR frame to which embodiment(s) are applicable.

FIG. 8 illustrates the slot structure of a NR frame to which the present disclosure is applicable.

Referring to FIG. 8, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 9:
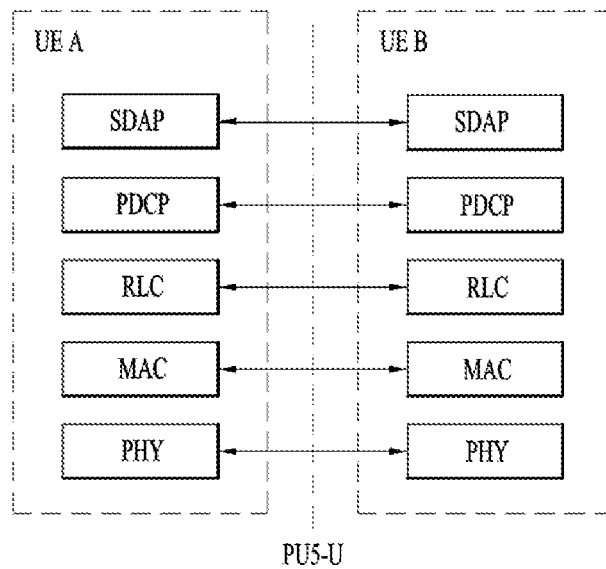
FIG. 9 illustrates a radio protocol architecture for SL communication.
Figure 9:
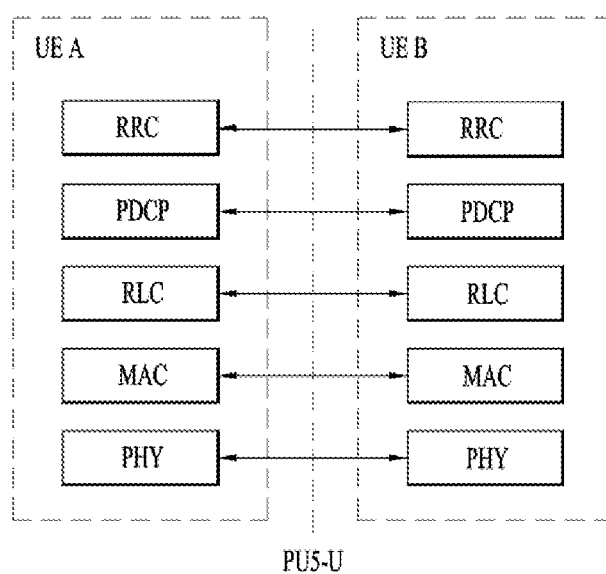

FIG. 9 illustrates a radio protocol architecture for SL communication. Specifically, FIG. 9-(a) shows a user plane protocol stack of NR, and FIG. 9-(b) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 10:
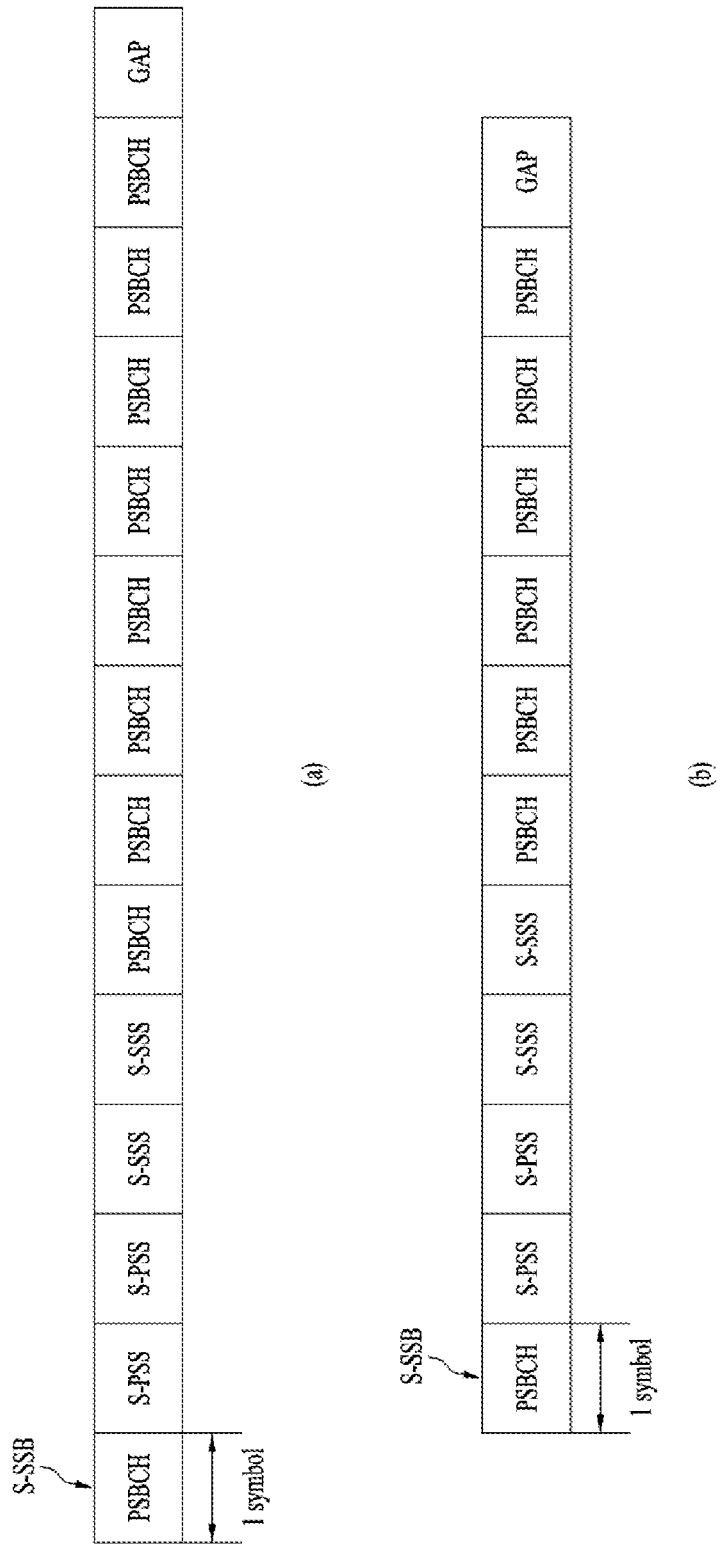
FIG. 10 shows the structures of an S-SSB according to CP types.

FIG. 10 illustrates the structures of an S-SSB according to CP types. FIG. 10-(a) shows the structure of the S-SSB when the CP type is NCP.

Figure 20:
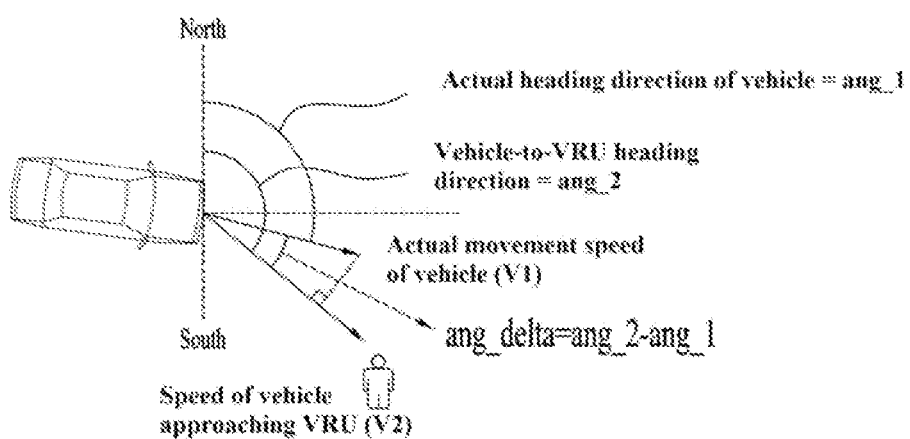
FIG. 20 is a diagram for explaining a method of calculating an approaching speed and a deceleration of a vehicle based on mobility information about a VRU and the vehicle.

For example, the structure of the S-SSB, that is, the order of symbols to which the S-PSS, S-SSS, and PSBCH are mapped in the S-SSB transmitted by the transmitting UE when the CP type is NCP may be shown in FIG. 20.

FIG. 10-(b) shows the structure of the S-SSB when the CP type is ECP.

For example, when the CP type is ECP, the number of symbols to which the transmitting UE maps the PSBCH after the S-SSS in the S-SSB may be 6, unlike in FIG. 20. Accordingly, the coverage of the S-SSB may differ between the CP types, NCP and ECP.

Each SLSS may have an SL synchronization identifier (SLSS ID).

For example, in the case of LTE SL or LTE V2X, the value of the SLSS ID may be defined based on a combination of two different S-PSS sequences and 168 different S-SSS sequences. For example, the number of SLSS IDs may be 336. For example, the value of the SLSS ID may be any one of 0 to 335.

For example, in the case of NR SL or NR V2X, the value of the SLSS ID may be defined based on a combination of two different S-PSS sequences and 336 different S-SSS sequences. For example, the number of SLSS IDs may be 672. For example, the value of the SLSS ID may be any one of 0 to 671. For example, one S-PSS of the two different S-PSSs may be associated with in-coverage, and the other S-PSS may be associated with out-of-coverage. For example, SLSS IDs of 0 to 335 may be used in in-coverage, and SLSS IDs of 336 to 671 may be used in out-of-coverage.

In order to improve the S-SSB reception performance of the receiving UE, the transmitting UE needs to optimize the transmit power according to the characteristics of respective signals constituting the S-SSB. For example, according to the peak to average power ratio (PAPR) of each signal constituting the S-SSB, the transmitting UE may determine the value of maximum power reduction (MPR) for each signal. For example, when the PAPR differs between the S-PSS and the S-SSS which constitute the S-SSB, the transmitting UE may apply an optimal MPR value to transmission of each of the S-PSS and the S-SSS in order to improve the S-SSB reception performance of the receiving UE. Also, for example, in order for the transmitting UE to perform an amplification operation on each signal, a transition period may be applied. The transition period may reserve a time required for the transmitter amplifier of the transmitting UE to perform a normal operation at the boundary where the transmit power of the transmitting UE varies. For example, in the case of FR1, the transition period may be 10 μs. For example, in the case of FR2, the transition period may be 5 μs. For example, a search window in which the receiving UE is to detect the S-PSS may be 80 ms and/or 160 ms.

Figure 11:
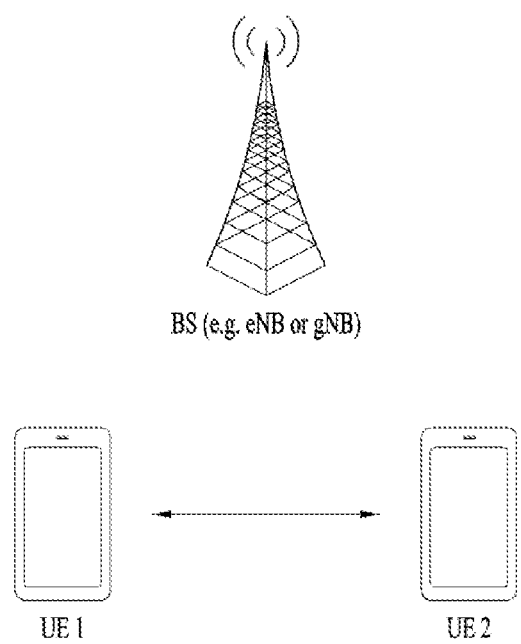
FIG. 11 illustrates UEs performing V2X or SL communication.

FIG. 11 illustrates UEs performing V2X or SL communication.

Referring to FIG. 11, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 12:
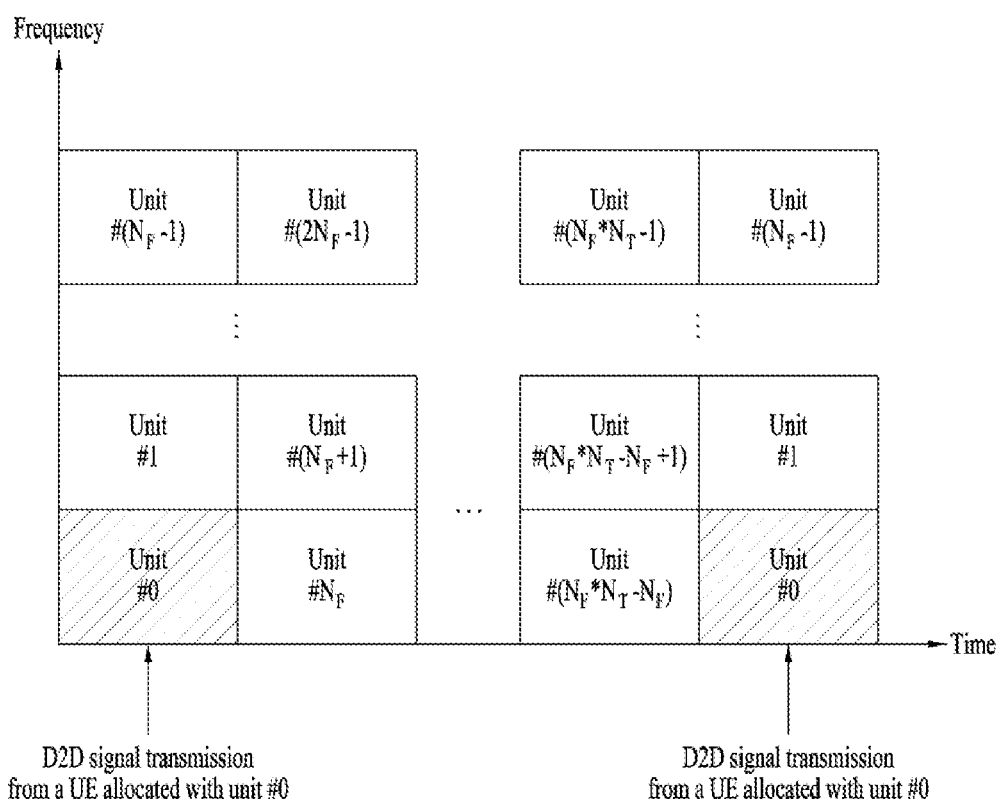
FIG. 12 illustrates resource units for V2X or SL communication.

FIG. 12 illustrates resource units for V2X or SL communication.

Referring to FIG. 12, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 12 shows an exemplary case where the resource pool is repeated with a periodicity of NT subframes.

As shown in FIG. 12, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 13:
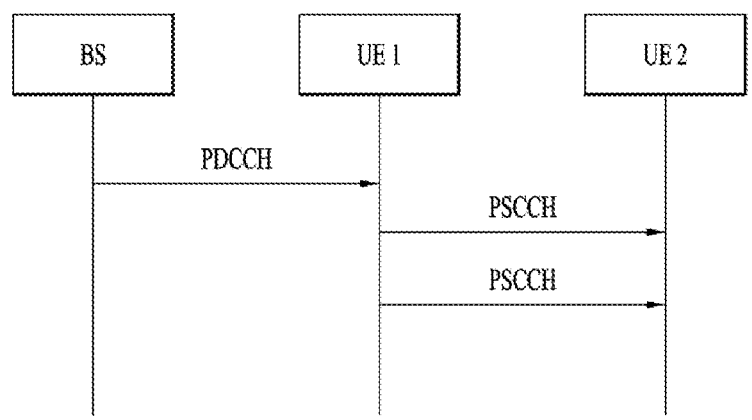
FIG. 13 illustrates a procedure in which UEs perform V2X or SL communication according to a transmission mode.
Figure 13:
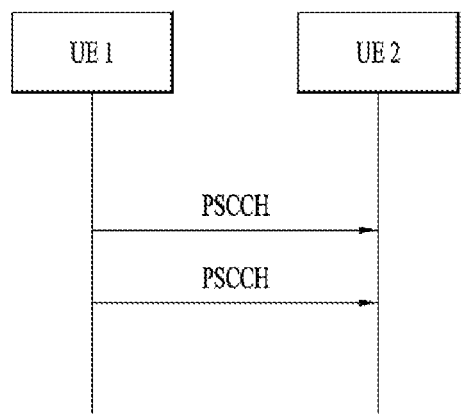

FIG. 13 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 13-(a) illustrates a UE operation related to LTE transmission mode 1 or LTE transmission mode 3. Alternatively, for example, FIG. 13-(a) illustrates a UE operation related to NR resource allocation mode 1. For example, LTE transmission mode 1 may be applied to general SL communication, and LTE transmission mode 3 may be applied to V2X communication.

For example, FIG. 13-(b) illustrates a UE operation related to LTE transmission mode 2 or LTE transmission mode 4. Alternatively, for example, FIG. 13-(b) illustrates a UE operation related to NR resource allocation mode 2.

Referring to FIG. 13-(a), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 13-(b), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information: and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 14:
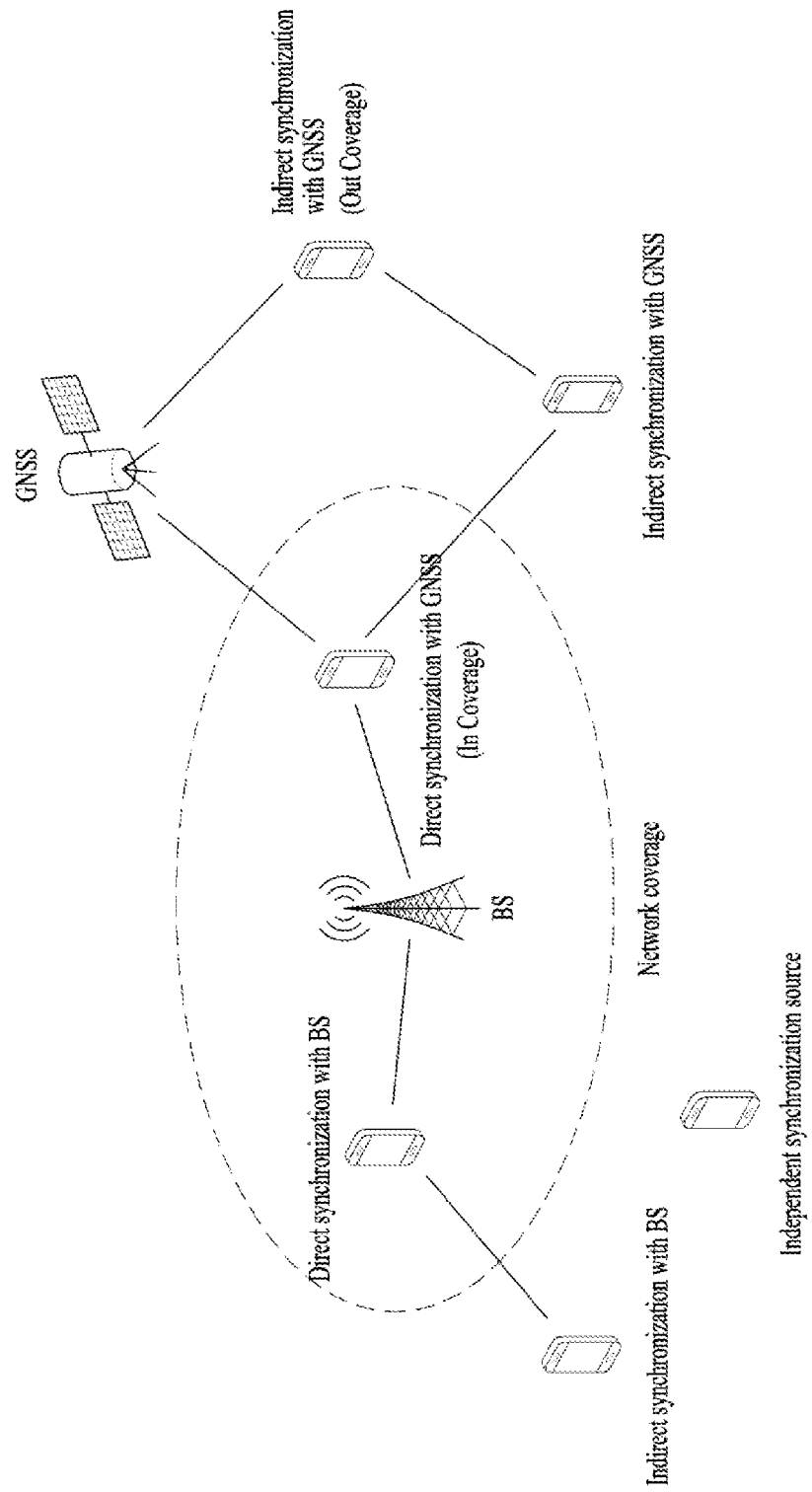
FIG. 14 illustrates a V2X synchronization source or synchronization reference to which embodiments(s) are applicable.

FIG. 14 illustrates a V2X synchronization source or reference to which the present disclosure is applicable.

Referring to FIG. 14, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not acquired synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Tables 5 and 6. Tables 5 and 6 are merely an example, and the relationship between synchronization sources and synchronization priorities may be defined in various manners.

TABLE 5

| Priority | GNSS-based synchronization | BS-based synchronization (eNB/gNB-based synchronization) |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) with low priority | Remaining UE(s) with low priority |

In Table 5 or Table 6, P0 may denote the highest priority, and P6 may denote the lowest priority. In Table 5 or Table 6, the BS may include at least one of a gNB or an eNB.

Whether to use GNSS-based synchronization or BS-based synchronization may be (pre)determined. In a single-carrier operation, the UE may derive its transmission timing from an available synchronization reference with the highest priority.

Vehicular Communications for ITS

An intelligent transport system (ITS) utilizing vehicle-to-everything (V2X) may mainly include an access layer, a network & transport layer, a facilities layer, an application layer, security and management entities, etc. Vehicle communication may be applied to various scenarios such as vehicle-to-vehicle communication (V2V), vehicle-to-network communication (V2N or N2V), vehicle-to-road side unit (RSU) communication (V2I or I2V), RSU-to-RSU communication (I2I), vehicle-to-pedestrian communication (V2P or P2V), and RSU-to-pedestrian communication (I2P or P2I). A vehicle, a BS, an RSU, a pedestrian, etc. as the subjects of vehicle communication are referred to as ITS stations.

Figure 15:
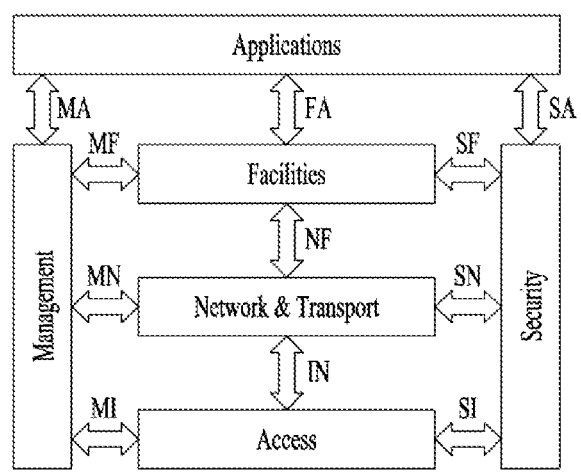
FIG. 15 is a diagram for explaining an ITS station reference architecture.

FIG. 15 is a diagram for explaining an ITS station reference architecture.

The ITS station reference architecture may include an access layer, a network & transport layer, a facilities layer, entities for security and management, and an application layer at the top. Basically, the ITS station reference architecture follows a layered OSI model.

Figure 16:
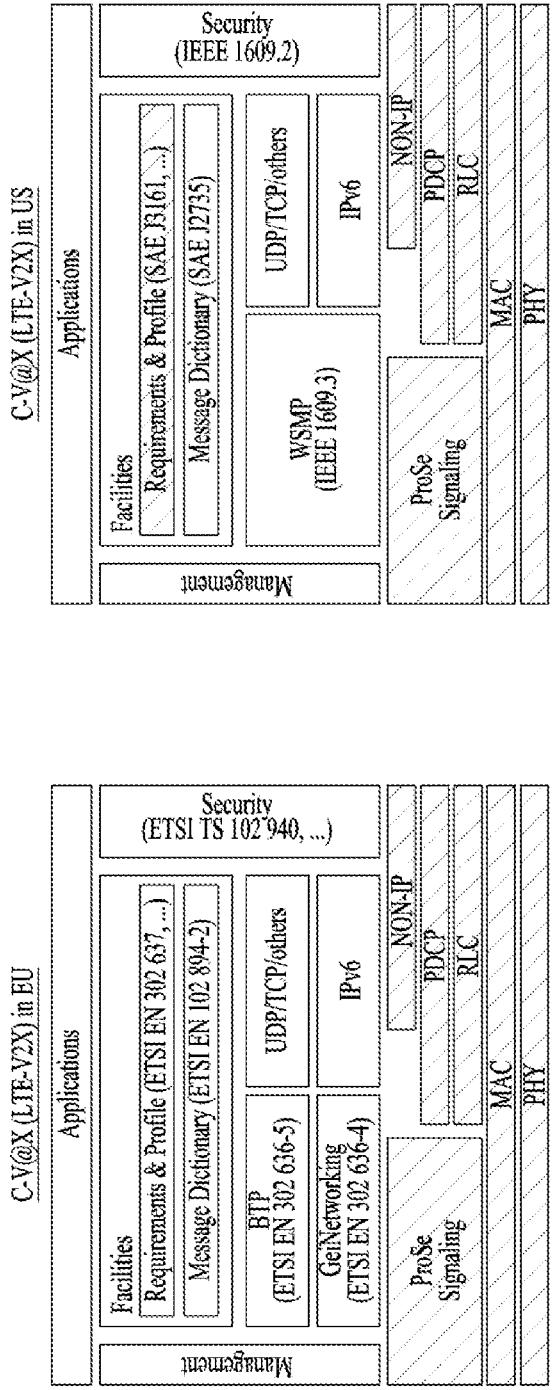
FIG. 16 illustrates an exemplary structure of an ITS station that may be designed and applied based on a reference architecture.

Specifically, features of the ITS station reference architecture based on the OSI model are illustrated in FIG. 16. The access layer of the ITS station corresponds to OSI layer 1 (physical layer) and layer 2 (data link layer), the network & transport layer of the ITS station corresponds to OSI layer 3 (network layer) and layer 4 (transport layer), and the facilities layer of the ITS station corresponds to OSI layer 5 (session layer), layer 6 (presentation layer), and layer 7 (application layer).

The application layer, which is located at the highest layer of the ITS station, may actually implement and support a use-case and may be selectively used according to the use-case. The management entity serves to manage all layers in addition to managing communication and operations of the ITS station. The security entity provides security services for all layers. Each layer of the ITS station exchanges data transmitted or received through vehicle communication and additional information for various purposes through an interface. The abbreviations of various interfaces are described below.

MA: Interface between management entity and application layer
MF: Interface between management entity and facilities layer
MN: Interface between management entity and networking & transport layer
MI: Interface between management entity and access layer
FA: Interface between facilities layer and ITS-S applications
NF: Interface between networking & transport layer and facilities layer
IN: Interface between access layer and networking & transport layer
SA: Interface between security entity and ITS-S applications
SF: Interface between security entity and facilities layer
SN: Interface between security entity and networking & transport layer
SI: Interface between security entity and access layer FIG. 16 illustrates an exemplary structure of an ITS station that may be designed and applied based on a reference architecture.

A main concept of the ITS station reference architecture is to allow each layer with a special function to process communication on a layer basis, between two end vehicles/users included in a communication network. That is, when a V2V message is generated, the data is passed through each layer downwards layer by layer in the vehicle and the ITS system (or other ITS-related UEs/systems), and a vehicle or ITS system (or other ITS-related UEs/systems) receiving the message passes the message upwards layer by layer.

The ITS system operating through vehicle communication and the network was organically designed in consideration of various access technologies, network protocols, communication interfaces, etc. to support various use-cases, and the roles and functions of each layer described below may be changed depending on a situation. The main functions of each layer will be briefly described.

The application later actually implements and supports various use-cases. For example, the application layer provides security, efficient traffic information, and other entertainment information.

The application layer controls an ITS station to which an application belongs in various manners or provides services by transferring a service message to an end vehicle/user/infrastructure through the access layer, the network & transport layer, and the facilities layer, which are lower layers of the application layer, by vehicle communication. In this case, the ITS application may support various use-cases. In general, these use-cases may be supported by grouping into other applications such as road-safety, traffic efficiency, local services, and infotainment. Application classification, use-cases, etc. may be updated when a new application scenario is defined. Layer management serves to manage and service information related to operation and security of the application layer, and the related information is transmitted and shared bidirectionally through an MA and an SA (or service access point (SAP), e.g. MA-SAP or SA-SAP). A request from the application layer to the facilities layer or a service message and related information from the facilities layer to the application layer may be delivered through an FA.

The facilities layer serves to support effective implementation of various use-cases defined in an application layer of a higher layer. For example, the facilities layer may perform application support, information support, and session/communication support.

The facilities layer basically supports the 3 higher layers of the OSI model, for example, a session layer, a presentation layer, and the application layer, and functions. Specifically, the facilities layer provides facilities such as application support, information support, and session/communication support, for the ITS. Here, the facilities mean components that provide functionality, information, and data.

The application support facilities support the operation of ITS applications (mainly generation of a message for the ITS, transmission and reception of the message to and from a lower layer, and management of the message). The application support facilities include a cooperative awareness (CA) basic service and a decentralized environmental notification (DEN) basic service. In the future, facilities entities for new services such as cooperative adaptive cruise control (CACC), platooning, a vulnerable roadside user (VRU), and a collective perception service (CPS), and related messages may be additionally defined.

The information support facilities provide common data information or a database to be used by various ITS applications and includes a local dynamic map (LDM).

The session/communication support facilities provide services for communications and session management and include an addressing mode and session support.

Facilities may be divided into common facilities and domain facilities.

The common facilities are facilities that provide common services or functions required for various ITS applications and ITS station operations, such as time management, position management, and service management.

The domain facilities are facilities that provide special services or functions required only for some (one or more) ITS applications, such as a DEN basic service for road hazard warning applications (RHW). The domain facilities are optional functions and are not used unless supported by the ITS station.

Layer management serves to manage and service information related to the operation and security of the facilities layer, and the related information is transmitted and shared bidirectionally through an MF and an SF (or MF-SAP and SF-SAP). The transfer of service messages and related information from the application layer to the facilities layer or from the facilities layer to the application layer is performed through an FA (or FA-SAP), and bidirectional service messages and related information between the facilities layer and the lower networking & transport layer are transmitted by an NF (or NF-SAP).

The network & transport layer servers to configure a network for vehicle communication between homogenous or heterogeneous networks through support of various transport protocols and network protocols. For example, the network & transport layer may provide Internet access, routing, and vehicle networking using Internet protocols such as TCP/UDP+IPv6 and form a vehicle network using a basic transport protocol (BTP) and GeoNetworking-based protocols. In this case, networking using geographic position information may also be supported. A vehicle network layer may be designed or configured depending on technology used for the access layer (access layer technology-independently) or regardless of the technology used for the access layer (access layer technology-independently or access layer technology agnostically).

Functionalities of the European ITS network & transport layer are as follows. Basically, functionalities of the ITS network & transport layer are similar to or identical to those of OSI layer 3 (network layer) and layer 4 (transport layer) and have the following characteristics.

The transport layer is a connection layer that delivers service messages and related information received from higher layers (the session layer, the presentation layer, and the application layer) and lower layers (the network layer, the data link layer, and the physical layer). The transport layer serves to manage data transmitted by an application of the ITS station so that the data accurately arrives at an application process of the ITS station as a destination. Transport protocols that may be considered in European ITS include, for example, TCP and UDP used as legacy Internet protocols, and there are transport protocols only for the ITS, such as the BTS.

The network layer serves to determine a logical address and a packet forwarding method/path, and add information such as the logical address of a destination and the forwarding path/method to a header of the network layer in a packet received from the transport layer. As an example of the packet method, unicast, broadcast, and multicast between ITS stations may be considered. Various networking protocols for the ITS may be considered, such as GeoNetworking, IPv6 networking with mobility support, and IPv6 over GeoNetworking. In addition to simple packet transmission, the GeoNetworking protocol may apply various forwarding paths or transmission ranges, such as forwarding using position information about stations including vehicles or forwarding using the number of forwarding hops.

Layer management related to the network & transport layer serves to manage and provide information related to the operation and security of the network & transport layer, and the related information is transmitted and shared bidirectionally through an MN (or MN-SAP) and an SN (or SN-SAP). Transmission of bidirectional service messages and related information between the facilities layer and the networking & transport layer is performed by an NF (or NF-SAP), and service messages and related information between the networking & transport layer and the access layer are exchanged by an IN (or IN-SAP).

A North American ITS network & transport layer supports IPv6 and TCP/UDP to support existing IP data like Europe, and a wave short message protocol (WSMP) is defined as a protocol only for the ITS.

A packet structure of a wave short message (WSM) generated according to the WSMP includes a WSMP header and WSM data carrying a message. The WSMP header includes Version, PSID, WSMP header extension fields, WSM WAVE element ID, and Length.

Version is defined by a WsmpVersion field indicating an actual WSMP version of 4 bits and a reserved field of 4 bits. PSID is a provider service identifier, which is allocated according to an application in a higher layer and helps a receiver to determine an appropriate higher layer. Extension fields is a field for extending the WSMP header, and includes information such as a channel number, a data rate, and transmit power used. WSMP WAVE element ID specifies the type of a WSM to be transmitted. Length specifies the length of transmitted WSM data in octets through a WSMLength field of 12 bits, and the remaining 4 bits are reserved. LLC Header allows IP data and WSMP data to be transmitted separately and is distinguished by Ethertype of a SNAP. The structures of the LLC header and the SNAP header are defined in IEEE802.2. When IP data is transmitted, Ethertype is set to 0x86DD in the LLC header. When WSMP is transmitted, Ethertype is set to 0x88DC in the LLC header. The receiver identifies Ethertype. If Ethertype is 0x86DD, the receiver transmits upward the packet to an IP data path, and if Ethertype is 0x88DC, the receiver transmits upward the packet to a WSMP path.

The access layer serves to transmit a message or data received from a higher layer on a physical channel. As access layer technologies, ITS-G5 vehicle communication technology based on IEEE 802.11p, satellite/broadband wireless mobile communication technology, 2G/3G/4G (long-term evolution (LTE), etc.)/5G wireless cellular communication technology, cellular-V2X vehicle-dedicated communication technologies such as LTE-V2X and NR-V2X (new radio), broadband terrestrial digital broadcasting technology such as DVB-T/T2/ATSC3.0, and GPS technology may be applied.

A data link layer is a layer that converts a physical line between adjacent nodes (or between vehicles) with noise into a communication channel without transmission error, for use in the higher network layer. The data link layer performs a function of transmitting/delivering/forwarding L3 protocols, a framing function of dividing data to be transmitted into packets (or frames) as transmission units and grouping the packets, a flow control function of compensating for a speed difference between a transmitter and a receiver, and a function of (because there is a high probability that an error and noise occurs randomly in view of the nature of a physical transmission medium) detecting a transmission error and correcting the error or detecting a transmission error based on a timer and an ACK signal by a transmitter in a method such as automatic repeat request (ACK) and retransmitting a packet that has not been correctly received. In addition, to avoid confusion between packets or ACK signals, the data link layer performs a function of assigning a sequence number to the packets and the ACK signals, and a function of controlling establishment, maintenance, and disconnection of a data link between network entities, and data transmission between network entities. The main functions of logical link control (LLC), radio resource control (RRC), packet data convergence protocol (PDCP), radio link control (RLC), medium access control (MAC), and multi-channel operation (MCO) included in the data link layer will be described below.

An LLC sub-layer enables the use of different lower MAC sub-layer protocols, and thus enables communication regardless of network topology. An RRC sub-layer performs functions such as broadcasting of cell system information required for all UEs within a cell, management of delivery, of paging messages, management (setup/maintenance/release) of RRC connection between a UE and an E-UTRAN, mobility management (handover), transmission of UE context between eNodeBs during handover, UE measurement reporting and control therefor, UE capability management, temporary assignment of a cell ID to a UE, security management including key management, and RRC message encryption. A PDCP sub-layer may performs functions such as IP packet header compression in a compression method such as robust header compression (ROHC), cyphering of a control message and user data, data integrity, and data loss prevention during handover. RLC sub-layer delivers a packet received from the higher PDCP layer in an allowed size of the MAC layer through packet segmentation/concatenation, increases data transmission reliability by transmission error and retransmission management, checks the order of received data, reorders data, and checks redundancy. A MAC sub-layer performs functions such as control of the occurrence of collision/contention between nodes for use of shared media among multiple nodes, matching a packet delivered from the higher layer to a physical layer frame format, assignment and identification of the address of the transmitter/receiver, detection of a carrier, collision detection, and detection of obstacles on the physical medium. An MCO sub-layer enables efficient provision of various services on a plurality of frequency channels. The main function of MCO sub-layer is to effectively distribute traffic load of a specific frequency channel to other channels to minimize collision/contention of communication information between vehicles in each frequency channel.

The physical layer is the lowest layer in the ITS layer architecture. The physical layer defines an interface between a node and a transmission medium and performs modulation, coding, and mapping of a transport channel to a physical channel, for bit transmission between data link layer entities and informs the MAC sub-layer of whether a wireless medium is busy or idle by carrier sensing or clear channel assessment (CCA).

Collision Risk Estimation Based on the Time to Collision in V2X with DRX

A vulnerable road user (VRU) may predict a risk of collision with another vehicle based on state information about the vehicle in order to minimize the collision risk. Hereinafter, a vehicle-to-VRU communication operation technology considering the VRU will be described.

Each VRU or related application may immediately start transmitting the first safety message when activated. Alternatively, the VRU device may calculate or estimate a collision risk between vehicles, and when the calculated collision risk exceeds a predetermined threshold, the VRU device may start transmission of a VRU safety message or switch to a separately configured mode in which transmission of the safety message is started. After the first safety message is transmitted, the safety message may be transmitted at fixed or random intervals. Alternatively, the transmission interval of the safety message after transmission of the first safety message may be dynamically adjusted according to a movement status of the VRU.

Meanwhile, the collision risk has been conventionally estimated by considering only the speed and deceleration of an approaching vehicle regardless of the distance between the VRU and the vehicle. In this case, since the collision risk is estimated to be the same even if the distance between the VRU and the vehicle is different, the effectiveness of the collision risk may be reduced, and thus a method for solving this problem is required.

Hereinafter, in order to determine whether there is a risk of collision with approaching vehicle(s), the VRU may estimate a collision risk based on the distance between the VRU and the vehicle(s), the speed of the vehicle(s), the deceleration of the vehicle(s), etc. Therethrough, the VRU device may enter a triggering mode that starts transmitting the safety message to the vehicle(s) based on more precise collision risk estimation. In other words, the VRU may more accurately estimate the collision risk by additionally considering information about a distance to the vehicle(s) and trigger the safety message based on the estimated collision risk at a more appropriate timing. In addition, the VRU may perform collision risk estimation by additionally considering environmental information and perform more precise collision risk estimation by additionally considering a heading direction of an approaching vehicle. The VRU may calculate a required time until moving objects collide by additionally considering the relationship between the speed and acceleration of an approaching vehicle and heading directions of a VRU and the vehicle that are moving and estimate the collision risk based on the calculated required time.

Figure 17:
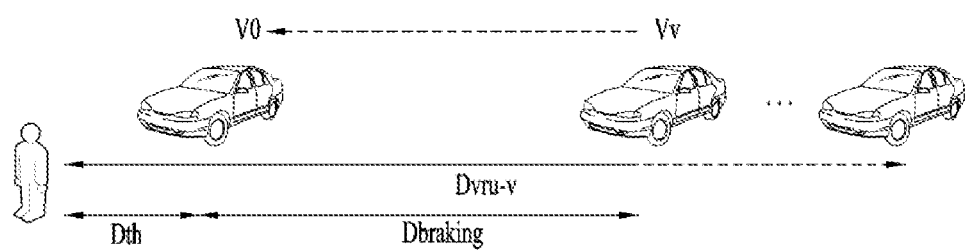
FIG. 17 is a diagram for explaining a method for a VRU to estimate a collision risk considering a distance to a vehicle.

FIG. 17 is a diagram for explaining a method for a VRU to estimate a collision risk considering a distance to a vehicle.

Referring to FIG. 17, if an approaching vehicle is moving at a speed Vv, and the driver of the vehicle detects a VRU and starts to reduce speed and decreases the speed to a deceleration Av, the vehicle may collide with the VRU after a first time Tbraking. Here, Vv is the speed of the vehicle approaching the VRU, and Av is the deceleration of the vehicle.

Here, the deceleration Av of the vehicle and the first time Tbraking until the vehicle is completely stopped may be calculated by Equation 1 below.

$$Av = Vv/Tbraking$$

$$Tbraking = Vv/Av \qquad \text{[Equation 1]}$$

Therefore, if the vehicle approaching at the speed Vv decelerates to the speed Av, a braking distance Dbraking of the vehicle until the vehicle is completely stopped may be calculated by Equation 2 below.

$$Dbraking = \tfrac{1}{2} * (Vv)^2 / Av \qquad \text{[Equation 2]}$$

However, realistically, the driver of the approaching vehicle may not decelerate immediately upon recognizing the VRU, and a certain amount of time is required to recognize and react to the VRU. For example, the VRU needs to detect the collision risk by additionally considering an awareness time Tva of the driver, which is a time required for the driver of the vehicle to recognize and respond to the VRU.

Accordingly, the VRU needs to detect the collision risk in consideration of the time consumed until the driver of the approaching vehicle recognizes the VRU. Specifically, when the vehicle moving at the speed of Vv approaches the VRU at the deceleration of Av, the braking distance Dbraking of the vehicle until the vehicle comes to a complete stop may be calculated by Equation 3 below.

$$Dbraking = Vv * Tva + \tfrac{1}{2} * (Vv)^2 / Av \qquad \text{[Equation 3]}$$

The VRU may detect the risk of collision with the vehicle by additionally considering a separately set threshold distance in order to ensure the safety of the VRU. Hereinafter, the above-described threshold distance is defined as Dth, and an actual separation distance between the vehicle and the VRU is defined as Dvru-v.

The VRU may estimate whether the risk of collision with the approaching vehicle exists based on Dth and Dbraking and determine whether to enter a trigger mode for triggering transmission of the safety message based on whether the estimated collision risk exists. When Dvru-v, which is the actual separation distance between the vehicle and the VRU, exceeds the sum of Dth and Dbraking (e.g., Dvru-v>Dth+Dbraking), the VRU may recognize that the VRU is currently in a safe state. Accordingly, the VRU may not enter the triggering mode for transmitting or triggering transmission of the safety message.

Therefore, the VRU may determine the collision risk as follows. When Dvru-v, which is the actual separation distance between the vehicle and the VRU, is less than or equal to the sum of Dth and Dbraking (Dbraking>=Dvru-v−Dth), the VRU may enter the triggering mode for transmitting or triggering transmission of the safety message.

Furthermore, VRU may dynamically change Dth based on environmental information about a surrounding environment. A specific method of changing Dth will be described with reference to FIG. 18.

Figure 18:
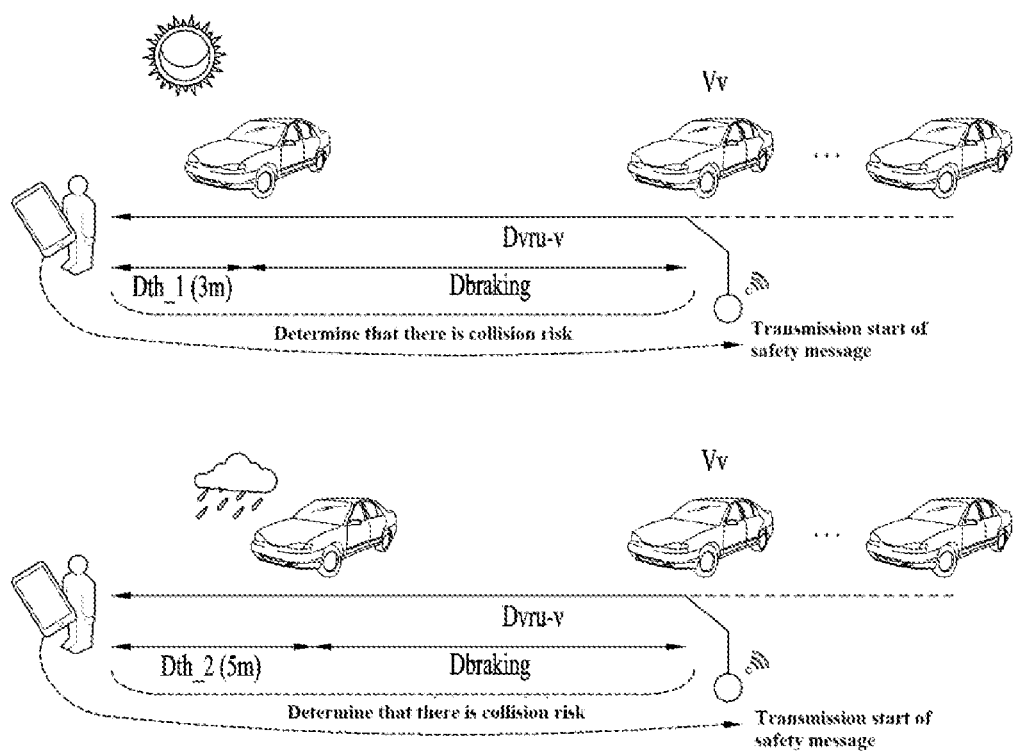
FIG. 18 is a diagram for explaining a method of detecting a collision risk according to a surrounding environment.

FIG. 18 is a diagram for explaining a method of detecting a collision risk according to a surrounding environment.

Referring to FIG. 18, the VRU may set Dth for a cloudy day or a rainy day in which it is difficult to secure visibility to be greater than Dth for sunny weather in which high visibility is secured. The weather may be directly sensed by the VRU through a sensor or may be acquired through a V2X message transmitted by surrounding VRUs or vehicles. That is, the distance at which it is judged that there is a collision risk increases more when an environmental situation is bad than when the environmental situation is good.

That is, the VRU may dynamically change Dth based on the environmental information about a surrounding environment. Specifically, the VRU may dynamically set the value of Dth based on Table 7 below.

TABLE 7

| Dth | Mode |
| --- | --- |
| Dth_1 = 3 m | Day time, Sunny day, General mode |
| Dth_2 = 5 m | Night time, Rainy day |
| Others | Other additionally available modes |

Figure 19:
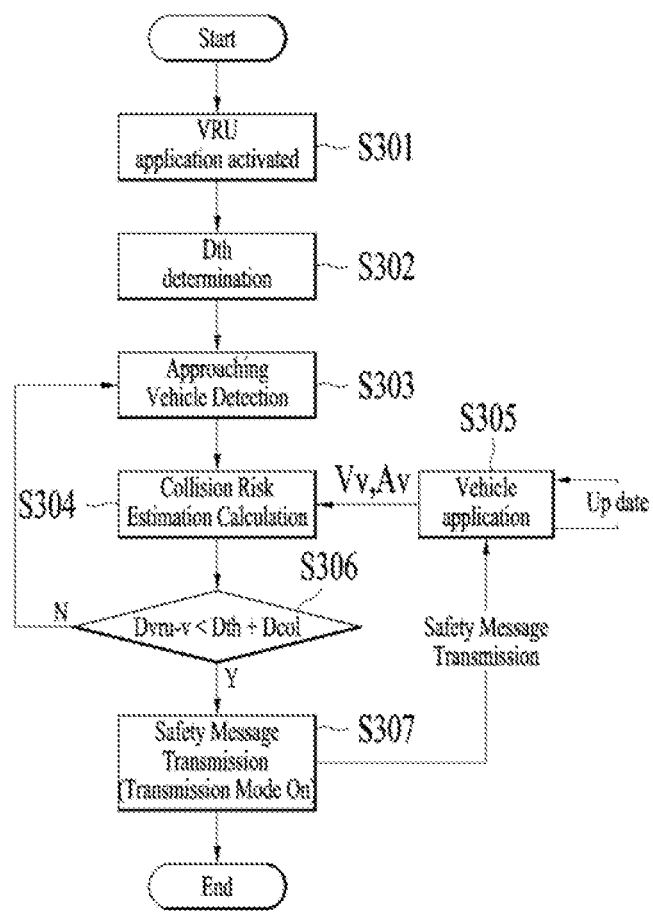
FIG. 19 is a flowchart related to a method of switching to a mode for transmitting a safety message according to a distance-based collision risk measurement method of a VRU device.

FIG. 19 is a flowchart related to a method of switching to a mode for transmitting a safety message according to a distance-based collision risk measurement method of a VRU device.

Referring to FIG. 19, the VRU may activate an application operation of the VRU (S301). That is, the application operation related to the VRU may be activated by a user or according to a preset operation schedule in relation to an activation operation.

The VRU may receive environmental information related to a surrounding environment and set a threshold distance Dth based on the received environmental information (S302). As described above, Dth may be dynamically set according to the surrounding environment.

The VRU may receive a V2X message periodically transmitted from surrounding vehicles. The VRU may detect a vehicle approaching within a preset range among the surrounding vehicles based on the received V2X message (S303).

The VRU may calculate or estimate whether there is a risk of collision with the approaching vehicle within the preset range (S304). The VRU may acquire mobility information (e.g., speed, heading direction, or movement path) of the vehicle through the V2X message and estimate or determine whether there is a collision risk based on the obtained mobility information (Av and Vv) (S305). The VRU may estimate whether the collision risk exists based on Equation 3 and the Dth.

Specifically, if the distance to the vehicle is shorter than the sum of Dth and Dvru-v (S306), the VRU may enter a triggering mode for triggering transmission of a safety message related to the collision risk (S307).

Alternatively, if the distance to the vehicle is longer than the sum of Dth and Dvru-v, the VRU may continue to monitor the vehicle without entering the triggering mode for triggering transmission of the safety message related to the collision risk (S304). For example, the VRU may continuously receive the V2X message for the vehicle and update information about Vv and Av of the vehicle based on the V2X message (S305). The VRU may determine whether to enter the triggering mode for triggering transmission of the safety message based on Vv and Av which have been updated and the distance to the vehicle.

FIG. 20 is a diagram for explaining a method of calculating an approaching speed and a deceleration of a vehicle based on mobility information about a VRU and the vehicle.

The VRU may calculate a proximity speed at which the vehicle actually approaches the VRU based on a heading direction of the vehicle. The VRU may detect a risk of collision with the approaching vehicle based on the proximity speed. The proximity speed may be input as the value of Vv in Equation 3 above.

Referring to FIG. 20, the VRU may determine or estimate a first angle ang_1, which is an actual heading direction of the vehicle, through the V2X message transmitted by the vehicle or through a sensor. The VRU may also determine or estimate a second angle ang_2 which is an angle formed with the vehicle. The VRU may determine a movement speed when the vehicle moves thereto based on the first angle and the second angle. Here, the second angle ang_2 minus the first angle ang_1, which is the difference between the actual heading direction of the vehicle and a vehicle-to-VRU heading direction, may be defined as a delta angle ang_delta.

In this case, the VRU may calculate a speed V2 and a deceleration $A_2$ of the vehicle using the delta angle ang_delta even in consideration of the vehicle-to VRU heading direction. $V_2$ and $A_2$ may be determined by Equation 4 below.

$$V_2 = V_1 * \cos(ang\_delta)$$

$$A_2 = A_1 * \cos(ang\_delta) \quad \text{[Equation 4]}$$

Here, $V_1$ and $A_1$ are an actual movement speed and an actual deceleration of the vehicle moving at the first angle.

Alternatively, the VRU may estimate a collision risk based on a time to collision (TTC), which is a time required until a collision occurs according to current locations, speeds, and accelerations of the vehicle and the VRU. Specifically, all VRUs and vehicles on the road may exist in various locations and may move in various headings. A method for the VRU to determine the TTC in consideration of such diversity will be described later.

Figure 21:
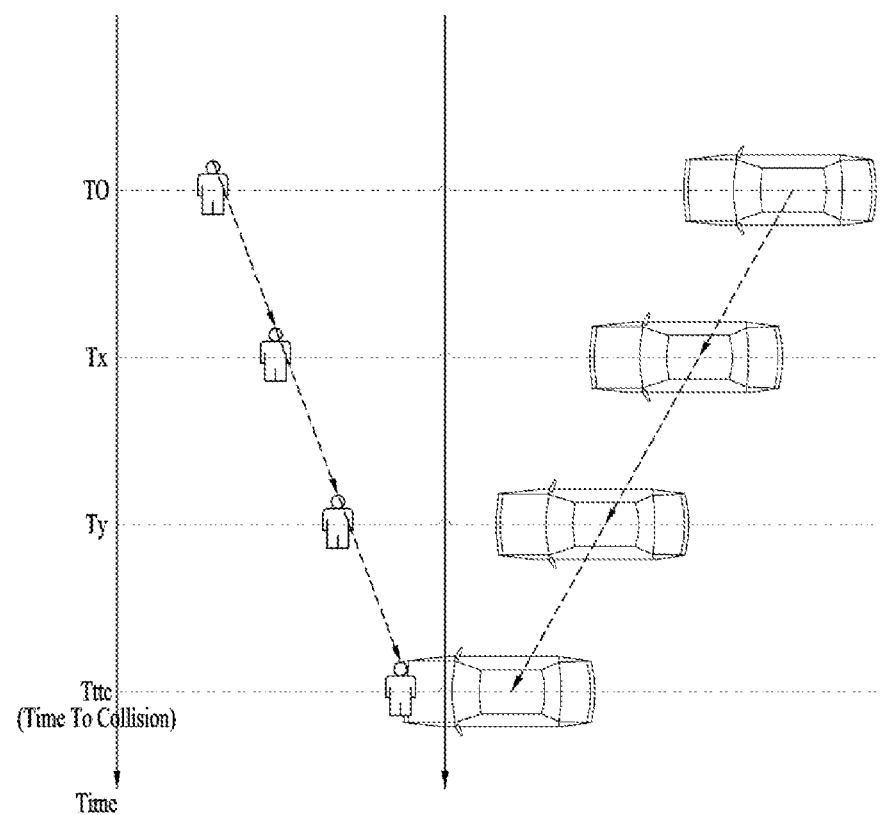
FIGS. 21 and 22 are diagrams for explaining a method for a VRU to calculate a time to collision (TTC) Tttc with a vehicle.
Figure 22:
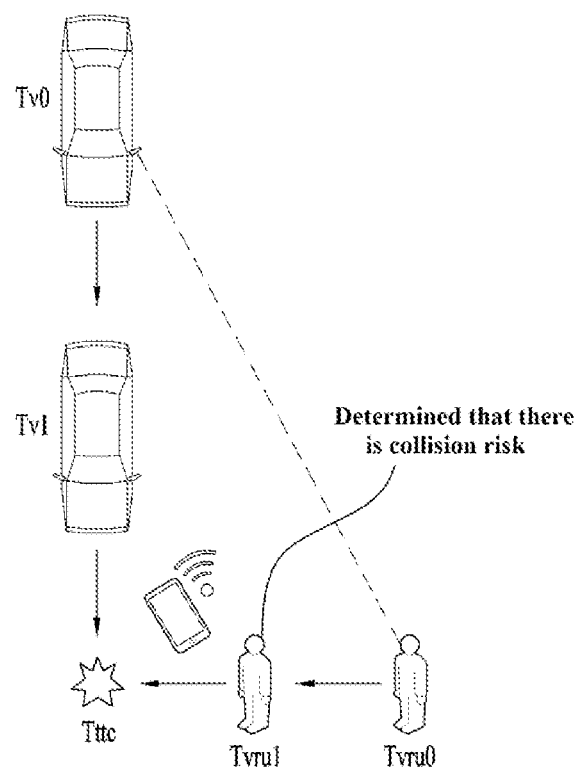

FIGS. 21 and 22 are diagrams for explaining a method for a VRU to calculate a TTC Tttc with a vehicle.

Referring to FIG. 21, when the VRU and the vehicle or another VRU approach each other while facing each other on a straight line, the VRU may detect the approaching vehicle separated by a distance of D0. When the vehicle approaching at a speed of Vvru0 is decelerated to a speed of Vv0 and is moving without changing direction, a TTC Tttc at which the VRU and the vehicle collide may be calculated by Equation 5 below.

$$Tttc = D0/(Vvru + Vv) \quad \text{[Equation 5]}$$

Here, the movement speed of the VRU is Vvru and the movement speed of the vehicle is Vv.

For example, when the VRU and the vehicle are moving at a speed of 1 m/s and at a speed of 10 m/s, respectively, while facing each other at a distance separated by 100 m, the TTC of the two moving objects is 100/11=9.0909 . . . . That is, it may be appreciated that there is a collision risk after 9.09 seconds at a point where the VRU moves 9.09 m and the vehicle moves 90.9 m.

When the VRU and the vehicle are accelerating at a constant acceleration instead of a constant speed, the TTC Tttc may be calculated by Equation 6 below.

$$D0 = Vvru * Tttc + \frac{1}{2}Avru * Tttc^2 + Vv * Tttc + \frac{1}{2}Av * Tttc^2 \quad \text{[Equation 6]}$$

$$Tttc = \begin{cases} \dfrac{-(Vvru + Vv) + \sqrt{(Vvru + Vv)^2 + 2D0(Avru + Av)}}{(Avru + Av)} & \text{for } Avru + Av > 0 \\ \dfrac{D0}{(Vvru + Vv)} & \text{for } Avru + Av = 0 \\ \dfrac{-(Vvru + Vv) - \sqrt{(Vvru + Vv)^2 + 2D0(Avru + Av)}}{(Avru + Av)} & \text{for } Avru + Av < 0 \end{cases}$$

Here, the distance between the VRU and the vehicle is D0, the movement speed of the VRU is Vvru, the movement speed of the vehicle is Vv, the acceleration of the VRU is Avru, and the acceleration of the vehicle is Av.

Referring to FIG. 21, a first time T0 is a timing at which the VRU detects the approaching vehicle. Meanwhile, an estimation threshold time Tttc_th related to the TTC may be preset by a VRU application. For example, the estimation threshold time Tttc_th related to the TTC may be preset to 15 seconds. Here, whether to transmit the safety message may be determined according to whether the TTC is equal to or shorter than the estimation threshold time Tttc_th. When the TTC at which collision is predicted when two moving objects move from the distance therebetween, based on the speeds and/or accelerations of the VRU and the vehicle at T0 is longer than the estimation threshold time, the collision risk may be regarded as low.

At a second time Tx after a specific time has elapsed, when the VRU and the vehicle are moving at constant speeds, and the TTC calculated according to Equation 6 is longer than the estimation threshold time, the VRU may judge that the VRU is safe.

At a third time Tv after a specific time has elapsed again, when the VRU and the vehicle are moving at constant speeds and the ITC calculated by Equation 6 is shorter than the estimation threshold time, the VRU may detect that a risk of collision with the vehicle exists. In this case, the VRU may display the safety message for the user of the VRU while transmitting the safety message to the vehicle.

Referring to FIG. 22, the VRU may be moving not on a straight line with the vehicle. In this case, the VRU may calculate the TTC with the vehicle based on Equation 7 below.

[Equation 7]

$$T_{ttc} = \begin{cases} \dfrac{-(V'vru + V'v) + \sqrt{(V'vru + V'v)^2 + 2D0(A'vru + A'v)}}{(A'vru + A'v)} & \text{for } A'vru + A'v > 0 \\ \dfrac{D0}{(V'vru + V'v)} & \text{for } A'vru + A'v = 0 \\ \dfrac{-(V'vru + V'v) - \sqrt{(V'vru + V'v)^2 + 2D0(A'vru + A'v)}}{(A'vru + A'v)} & \text{for } A'vru + A'v < 0 \end{cases}$$

Where $V'vru = VVru * \cos(ang\_delta\_vru)$,
$$A'vru = Avru * \cos(ang\_delta\_vru)$$

Here, V'vru is Vvru*cos(ang_delta_vru), A'vru is Avru*cos(ang_delta_vru), V'v is Vv*cos(ang_delta_v), and A'v=Av*cos(ang_delta_v). As described above, ang_delta_vru is an angle between a heading direction of the VRU and a straight line connecting the VRU to the vehicle, and ang_delta_v is an angle between a heading direction of the vehicle and the straight line connecting the VRU to the vehicle.

The VRU may detect the vehicle approaching in the vicinity thereof (Tyru0, Tv0). The VRU may calculate a TTC taken from an intersection to a point at which collision may occur using information such as movement speeds, accelerations, and heading directions of the vehicle and the VRU. When the TTC is longer than the estimation threshold time Tttc_th preset by the VRU application, the VRU determines that it is in a safe state up to now and does not trigger the safety message.

The VRU may continuously monitor the vehicle approaching in the vicinity thereof (Tvru1, Tv1). When the TTC calculated based on mobility information about the vehicle is shorter than the estimation threshold time Tttc_th, the VRU may determine that there is a collision risk and transmit the safety message to the approaching vehicle.

In addition, the VRU may dynamically change the estimation threshold time Tttc_th according to a surrounding environment as shown in Table 8. That is, the scope of judgment of the collision risk is wider when an environmental situation is bad than when the environmental situation is good.

TABLE 8

| Tttc_th | Mode |
| --- | --- |
| 10 seconds | Day time, Sunny day, General mode |
| 20 seconds | Night time, Rainy day |
| Others | Other additionally available modes |

On the other hand, the parameters described above in Equations 1 to 6 may be obtained or estimated based on the V2X message of the vehicle. For example, the V2X message transmitted by the vehicle may include information about a deceleration, an acceleration, a speed, a heading direction, a vehicle type, and the like. If the V2X message does not include information about the deceleration, information about a mapping relationship of a general deceleration for each vehicle type is preconfigured for the VRU, and the VRU may obtain a deceleration corresponding to a vehicle type included in the V2X message based on the mapping relationship.

Figure 23:
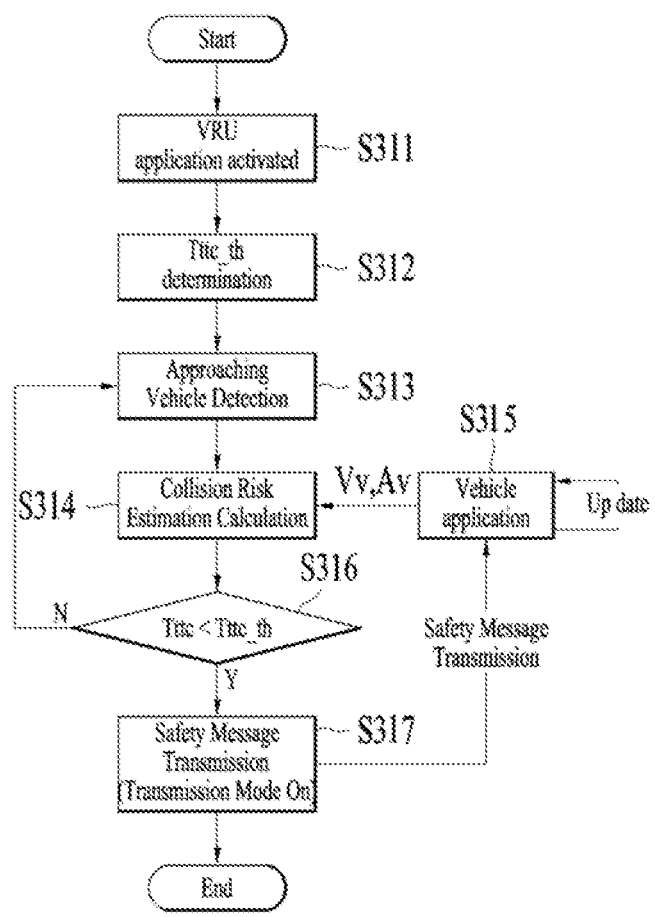
FIG. 23 is a flowchart related to a method of switching to a transmission mode of a safety message based on a TTC.

FIG. 23 is a flowchart related to a method of switching to a transmission mode of a safety message based on a TTC.

Referring to FIG. 23, the VRU may activate an application operation thereof (S311). That is, The VRU may activate the application operation related thereto by a user or according to an operation schedule preconfigured in relation to an activation operation.

The VRU may receive environmental information related to a surrounding environment and determine an estimation threshold time Tttc_th based on the received environmental information (S312). As described above, the estimation threshold time may be dynamically determined according to the surrounding environment.

The VRU may receive a V2X message periodically transmitted from surrounding vehicles. The VRU may detect an approaching vehicle within a preset range among the surrounding vehicles based on the received V2X message (S313).

The VRU may calculate or estimate whether there is a risk of collision with the approaching vehicle within the preset range (S314). The VRU may acquire mobility information (e.g., a speed, a vehicle type, a deceleration, a heading direction, or a movement path) of the vehicle through the V2X message and estimate or determine whether the collision risk exists based on the obtained mobility information (Av and Vv) (S315). The VRU may estimate whether the collision risk exists based on Equations 5 to 7 and the estimation threshold time.

Specifically, if the ITC with the vehicle is shorter than the estimation threshold time (S316), the VRU may enter a triggering mode for triggering transmission of the safety message related to the collision risk (S317).

Alternatively, if the TTC with the vehicle is longer than the estimation threshold time, the VRU may continuously monitor the vehicle without entering the triggering mode for triggering transmission of the safety message related to the collision risk (S314). For example, the VRU may continue to receive the V2X message about the vehicle and update the information about Vv and Av of the vehicle based on the V2X message (315). The VRU may determine whether to trigger the transmission of the safety message in relation to the vehicle by repeatedly calculating the TTC according to Vv and Av which have been updated.

The VRU may acquire situation information related to a surrounding environment through V2X communication. The VRU may dynamically determine an estimation threshold distance and/or the estimation threshold time based on the situation information.

Specifically, the VRU may adjust the estimation threshold distance and/or the estimation threshold time upon receiving the following information as a decentralized environmental notification message (DENM). The VRU may receive the DENM including environmental information related to a weather condition or a surface condition in connection with calculation of the collision risk based on a received CAM. The VRU may dynamically adjust the estimation threshold distance or the estimation threshold time based on the received environmental information.

In relation to the DENM, the VRU may obtain information about eventType included in SituationContainer based on the following DENM.

```
SituationContainer :: = SEQUENCE {
InformationQuality ImformationQuality,
eventType Causecode,
linkedCause Casusecode OPTIONAL,
eventHistory OPTIONAL,
... }
In addition, the VRU may acquire information about Causecode based on the
following DENM. Causecode may include causeCode defined as CauseCodeType and
subCauseCode defined as SubCauseCodeType as follows.
Causecode:: = SEQUENCE {
causeCode CauseCodeType,
subcauseCode SubCauseCodeType,
... }
```

CauseCodeType and SubCauseCodeType are defined as integer values between 0 and 255, and the meaning of a code defined by each integer value may be defined as shown in Table 9 below.

TABLE 9

```
CauseCodeType ::= INTEGER {
    reserved (0),
    trafficCondition (1),
    accident (2),
    roadworks (3),
      impassability (5),
    adverseWeatherCondition-Adhesion (6),
      aquaplannning (7),
    hazardousLocation-SurfaceCondition (9),
    hazardousLocation-ObstacleOnTheRoad (10),
    hazardousLocation-AnimalOnTheRoad (11),
    humanPresenceOnTheRoad (12),
    wrongWayDriving (14),
    rescueAndRecoveryWorkInProgress (15),
    adverseWeatherCondition-ExtremeWeatherCondition (17),
    adverseWeatherCondition-Visibility (18),
    adverseWeatherCondition-Precipitation (19),
    slowVehicle (26),
    dangerousEndOfQueue (27),
    vehicleBreakdown (91),
    postCrash (92),
    humanProblem (93),
    stationaryVehicle (94),
    emergencyVehicleApproaching (95),
    hazardousLocation-DangerousCurve (96),
    collisionRisk (97),
    signalViolation (98),
    dangerousSituation (99)
} (0..255)
```

When CauseCodeType is 9, the following information may be further included.
harzardousLocation-SurfaceConditionSubCauseCode
::= INTEGER {unavailable (0), rockfalls (1), earthquakeDamage (2), sewerCollapse (3), subsidence (4), snowDrifts (5), stormDamage (6), burstpipe (7), volcanoEruption (8), fallingIce (9)}90.255)

When CauseCodeType is any one of 6, 17, 18, and 19, the following information may be further included.
adverseWeatherCondition-ExtremeWeatherConditionSubCauseCode ::= INTEGER {unavailable (0), strongWinds (1), damagingHail (2), hurricane (3), thunderstorm (4), tornado (5), blizzard (6)} (0.255)
adverseWeatherCondition-ExtremeWeatherConditionSubCauseCode ::= INTEGER {unavailable (0), heavyFrostOnRoad (1), fuelOnRoad (2), mudOnRoad (3), snowOnRoad (4), iceOnRoad (5), blackIceOnRoad (6), oilOnRoad (7), looseChippings (8), instantBlackIce (9), roadsSalted (10)} (0.255)
adverseWeatherCondition-VisibilitySubCauseCode
::=INTEGER {unavailable (0), fog (1), smoke (2), heawSnowfall (3), heavyRain (4), heavyHail (5), lowSunGlare (6), sandstorrns (7), swarmsOfInsects (8)}(0.255)
adverseWeatherCondition-PrecipitationSubCauseCode
::= INTEGER {unavailable (0), heavyRain (1), heavySnowfall (2), softhail (3)}(0.255)

That is, the VRU may acquire information about a weather state, a ground state, a road danger state, etc. from values indicated by CauseCodeType and SubCauseCodeType from the DENM.

Specifically, the VRU may dynamically change the estimation threshold distance and/or the estimation threshold time based on an eventType value included in the received DENM. For example, upon receiving the DENM including CauseCode=6 (AdverseWeatherCondition-Adhesion) && SubCauseCode=5 (iceOnRoad), the VRU may increase the estimation threshold time or the estimation threshold distance by 30%. A ratio for increasing or decreasing the estimation threshold time or the estimation threshold distance may be preset for each event.

Alternatively, upon receiving the DENM including CauseCode=17 (AdverseWeatherCondition-ExtremeWeatherCondition) && SubCauseCode=3 (hurricane), the VRU may increase the estimation threshold time or the estimation threshold distance by 100%.

Figure 24:
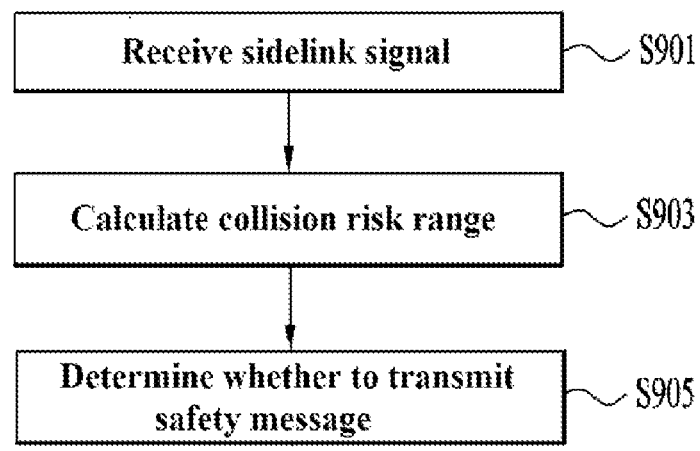
FIG. 24 is a diagram for explaining a method for a UE to transmit a safety message.

FIG. 24 is a diagram for explaining a method for a UE to transmit a safety message.

Referring to FIG. 24, the UE may receive a sidelink signal from an adjacent UE (S901). The UE may detect that the adjacent UE is approaching based on the received sidelink signal. Specifically, the UE may detect that the sidelink signal is received at a signal strength greater than or equal to a preset reception strength from the adjacent UE or that the adjacent UE is approaching based on location information included in the sidelink signal. Here, the sidelink signal may be a V2X message or a CAM that is an inter-vehicle sidelink signal.

The UE may calculate a collision risk range related to whether there is a risk of collision with the adjacent UE based on mobility information included in the sidelink signal (S903). The collision risk range may be an area or range in which collision between the adjacent UE and the UE is highly likely to occur, determined based on the mobility information. The mobility information may include information about the location, speed, and heading direction of the adjacent UE.

Specifically, the collision risk range may be calculated based on the braking distance calculated based on Equations 1 to 3 or the TTC calculated according to Equations 4 to 7. In addition, the collision risk range is a danger radius corresponding to a risk distance or a collision risk time calculated based on the mobility information about the UE. The UE may determine whether to transmit the safety message based on whether the distance to the adjacent UE exists within the danger radius or the adjacent UE enters the danger radius.

Alternatively, the UE may estimate a deceleration based on type information about a vehicle related to the adjacent UE included in the sidelink signal and calculate the collision risk range based on the estimated deceleration and the mobility information. Specifically, the UE may pre-store deceleration information for an average deceleration according to the vehicle type and estimate a deceleration for a vehicle type included in the sidelink signal or the CAM transmitted by the adjacent UE from the deceleration information.

Alternatively, the UE may correct the estimated deceleration based on a DENM received from the adjacent UE, another adjacent UE, or a BS. Alternatively, the UE may apply a correction value corresponding to a value defined in CauseCodeType or SubCauseCodeType included in the DENM to the estimated deceleration. For example, if a deceleration for a vehicle of type A is 10 and the DENM indicates an event related to snow, the UE may correct the deceleration to 8 by applying a correction value of −20% corresponding to the event value.

Alternatively, the UE may estimate the deceleration of a vehicle related to the adjacent UE based on the mobility information included in the sidelink signal. For example, the UE may estimate a deceleration corresponding to a movement speed of the adjacent UE in consideration of a change in deceleration according to a movement speed. For example, the UE may increase or decrease a preset specific deceleration according to a movement speed corresponding to the mobility information. Here, the preset specific deceleration may be an average deceleration of vehicles of a plurality of types.

The UE may additionally apply a preset estimation threshold value to the calculated collision risk range and determine whether to transmit the safety message based on the collision risk range to which the estimation threshold is applied (S905). The estimation threshold value is a value for further expanding the collision risk range in order to further ensure the stability of a user of the UE. In addition, the estimation threshold value may be changed based on acquired information about a surrounding environment. The information about the surrounding environment may be obtained from the DENM transmitted by an adjacent UE, another adjacent UE, and/or a BS or may be obtained through a sensor included in the UE.

Alternatively, the UE may acquire the information about the surrounding environment based on a value defined for CauseCodeType or SubCauseCodeType included in the received DENM. The UE may determine the preset estimation threshold value according to the value defined for CauseCodeType or SubCauseCodeType. For example, when a value for CauseCodeType is defined as 10, the UE may determine a threshold value corresponding to 10 as the preset estimation threshold value.

Alternatively, the UE may determine the preset estimation threshold value by applying a corresponding increase rate based on the value defined for CauseCodeType or SubCauseCodeType included in the received DENM. In other words, a mapping table for the increase rate corresponding to each value defined for CauseCodeType or SubCauseCodeType may be preconfigured for the UE, and the UE may apply the increase rate defined for CauseCodeType or SubCauseCodeType included in the received DENM to the preset estimation threshold value based on the preconfigured mapping table. For example, if the estimation threshold value which is preset before the UE receives the DENM is 10 m and the increase rate corresponding to the value defined for CauseCodeType or SubCauseCodeType included in the received DENM is 50%, the UE may determine the preset estimation threshold value as 15 m.

Alternatively, the UE may transmit the safety message when the adjacent UE enters the collision risk range. The UE may repeatedly transmit the safety message and determine the size of a repeated cycle according to a movement speed of the UE. For example, when the UE moves at a speed faster than or equal to a preset threshold speed, the UE may shorten an interval of the cycle.

Alternatively, the UE may determine a transmission cycle of the safety message based on event information included in the DENM message. When the DENM message includes event information about bad weather, a dangerous area, etc., the transmission cycle of the safety message may be shortened.

In this way, the UE may transmit the safety message at an appropriate timing according to a surrounding environment by adjusting the collision risk range and the transmission cycle of the safety message in consideration of the surrounding environment based on the DENM and efficiently ensure the safety of the user of the UE therethrough.

Hereinafter, an apparatus using the above-described methods will be described in detail.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 25:
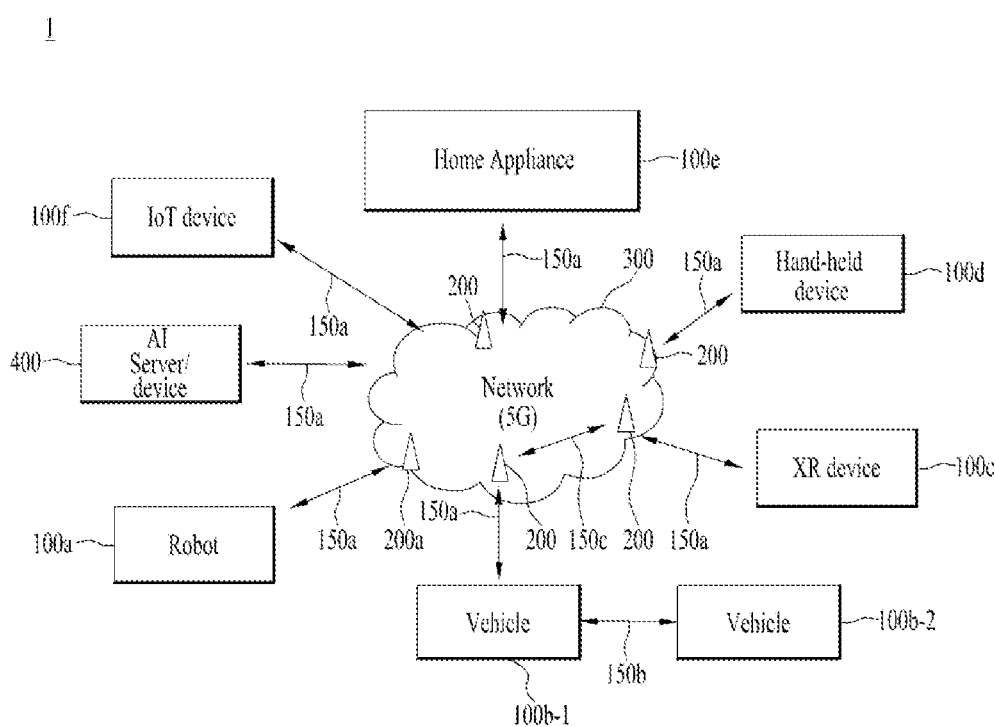
FIG. 25 illustrates a communication system applied to the present disclosure.

FIG. 25 illustrates a communication system applied to the present disclosure.

Referring to FIG. 25, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 26:
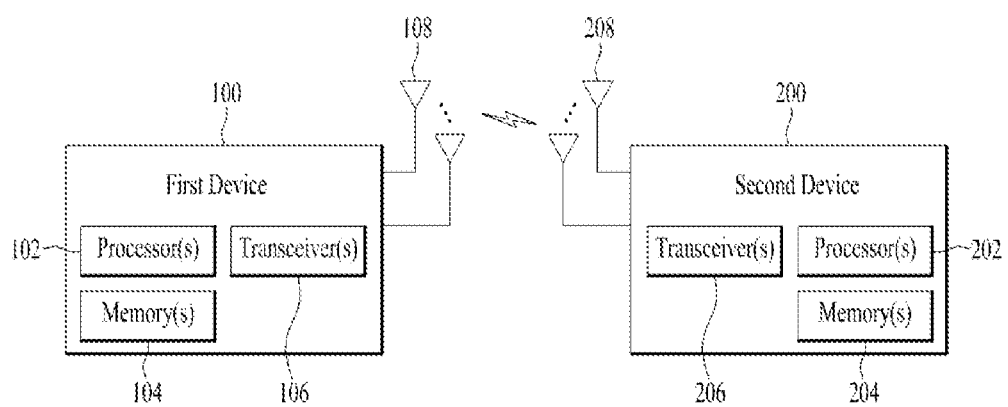
FIG. 26 illustrates wireless devices applicable to the present disclosure.

FIG. 26 illustrates a wireless device applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE may include the processor 102 connected to the RF transceiver, and the memory 104. The memory 104 may include at least one program capable of performing operations related to the embodiments described with reference to FIGS. 15 to 23.

The processor 102 may control the RF transceiver to receive a sidelink signal including mobility information about an adjacent UE from the adjacent UE and calculate a collision risk range with the adjacent UE based on the mobility information about the adjacent UE. The processor 102 may determine whether to transmit a safety message based on the collision risk range to which an estimation threshold value is applied. The estimation threshold value may be determined based on a received DENM. The processor 102 may perform operations of determining a transmission timing of the safety message based on the program included in the memory 104 by calculating the collision risk range and determining the estimation threshold value as described with reference to FIGS. 15 to 23.

Alternatively, a chipset including the processor 102 and the memory 104 may be configured. In this case, the chipset includes at least one processor, and at least one memory operably coupled to the at least one processor and, when executed, causing the at least one processor to perform an operation. The operation may include receiving a sidelink signal including mobility information about an adjacent UE from the adjacent UE, calculating a collision risk range with the adjacent UE based on the mobility information about the adjacent UE, and determining whether to transmit the safety message based on the collision risk range to which an estimation threshold value is applied. The estimation threshold value is determined based on a received DENM. The processor 102 may perform operations of determining the transmission timing of the safety message based on the program included in the memory 104 by calculating the collision risk range and determining the estimation threshold value as described with reference to FIGS. 15 to 23.

Alternatively, a computer-readable storage medium including at least one computer program for causing the at least one processor to perform an operation is provided. The operation may include receiving a sidelink signal including mobility information about an adjacent UE from the adjacent UE, calculating a collision risk range with the adjacent UE based on the mobility information about the adjacent UE, and determining whether to transmit the safety message based on the collision risk range to which an estimation threshold value is applied. The estimation threshold value is determined based on a received DENM. The computer program may include programs through which operations of determining the transmission timing of the safety message by calculating the collision risk range and determining the estimation threshold value as described with reference to FIGS. 15 to 23 may be performed.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs). Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 27:
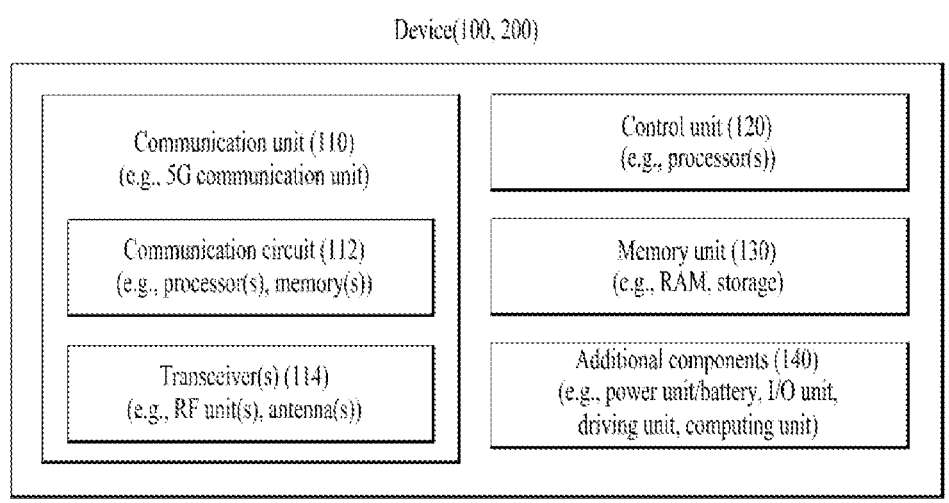
FIG. 27 illustrates another example of a wireless device to which the present disclosure is applied. The wireless device may be implemented in various forms according to use-examples/services.

FIG. 27 illustrates another example of a wireless device applied to the present disclosure. The wireless device may be implemented in various forms according to a use-case/service (refer to FIG. 25)

Referring to FIG. 27, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 27, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Examples of Mobile Devices to which the Present Disclosure is Applied

Figure 28:
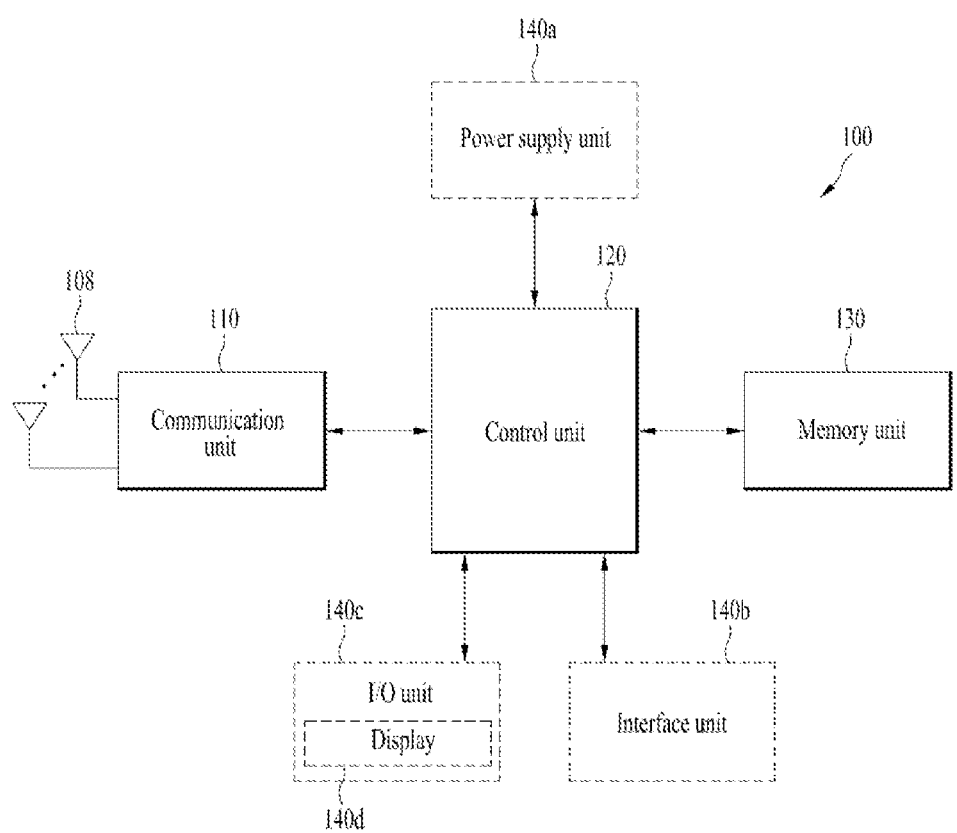
FIG. 28 illustrates a hand-held device applied to the present disclosure.

FIG. 28 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 28, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 27, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 29:
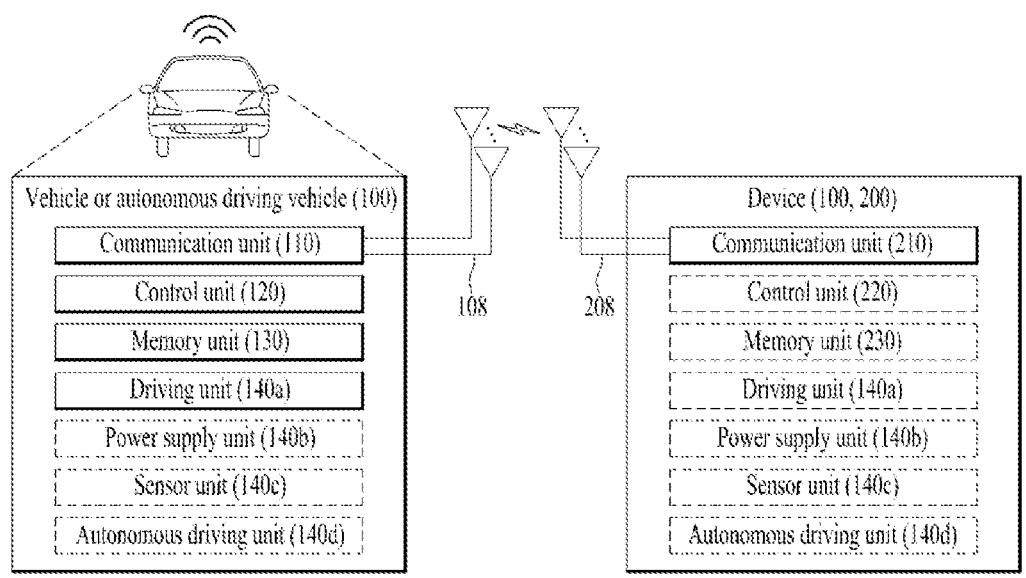
FIG. 29 illustrates a vehicle or an autonomous driving vehicle applied to the present disclosure.

Examples of Vehicles or Autonomous Vehicles to which the Present Disclosure is Applied FIG. 29 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the acquired data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc.

Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

What is claimed is:

1. A method of transmitting a safety message by a user equipment (UE) in a wireless communication system supporting sidelink, the method comprising:
    receiving a sidelink signal including mobility information about an adjacent UE from the adjacent UE;
    calculating a collision risk range in relation to the adjacent UE based on the mobility information about the adjacent UE; and
    determining whether to transmit the safety message based on the collision risk range to which an estimation threshold value is applied,
    wherein the estimation threshold value is determined based on a received decentralized environmental notification message (DENM).

2. The method of claim 1, wherein the estimation threshold value is dynamically changed based on a value defined in CauseCodeType or SubCauseCodeType included in the received DENM.

3. The method of claim 1, wherein the estimation threshold value is changed based on an increase ratio preset per a value defined in a CauseCodeType or a SubCauseCodeType.

4. The method of claim 1, wherein the collision risk range is increased by application of the estimation threshold value.

5. The method of claim 1, wherein the collision risk range is determined by further considering a deceleration calculated based on the sidelink signal.

6. The method of claim 5, wherein the deceleration is calculated based on vehicle type information included in the sidelink signal.

7. The method of claim 6, wherein the deceleration is corrected based on a value defined in CauseCodeType or SubCauseCodeType included in the DENM.

8. The method of claim 1, wherein the collision risk range is determined by further considering a size of an angle between a heading direction of the UE, and a heading direction of the adjacent UE included in the mobility information.

9. The method of claim 1, wherein a transmission cycle of the safety message is changed based on a movement speed of the UE.

10. The method of claim 1, wherein the safety message is repeatedly transmitted at a transmission cycle determined based on event information included in the DENM.

11. The method of claim 1, wherein a transmission timing of the safety message is determined based on a timing at which the adjacent UE enters within the collision risk range to which the estimation threshold value is applied.

12. The method of claim 1, wherein the sidelink signal is a cooperative awareness message (CAM).

13. A user equipment (UE) for transmitting a safety message in a wireless communication system supporting sidelink, the UE comprising:
    a radio frequency (RF) transceiver; and
    a processor connected to the RF transceiver,
    wherein the processor controls the RF transceiver to receive a sidelink signal including mobility information about an adjacent UE from the adjacent UE, calculates a collision risk range in relation to the adjacent UE based on the mobility information about the adjacent UE, and determines whether to transmit the safety message based on the collision risk range to which an estimation threshold value is applied, and
    wherein the estimation threshold value is determined based on a received decentralized environmental notification message (DENM).

14. A chipset for transmitting a safety message in a wireless communication system supporting sidelink, the chipset comprising:
    at least one processor; and
    at least one memory operably connected to the at least one processor and configured to cause the at least one processor to perform an operation based on execution of the at least one processor,
    wherein the operation includes:
    receiving a sidelink signal including mobility information about an adjacent UE from the adjacent UE;
    calculating a collision risk range in relation to the adjacent UE based on the mobility information about the adjacent UE; and
    determining whether to transmit the safety message based on the collision risk range to which an estimation threshold value is applied, and
    wherein the estimation threshold value is determined based on a received decentralized environmental notification message (DENM).

15. The chipset of claim 14, wherein the processor controls a traveling mode of an apparatus connected to the chipset based on the collision risk range.

* * * * *